US006848900B2

(12) United States Patent
Romanski et al.

(10) Patent No.: US 6,848,900 B2
(45) Date of Patent: Feb. 1, 2005

(54) APPARATUS FOR HANDLING INJECTION MOLDED PREFORMS

(75) Inventors: Zbigniew Romanski, Mississauga (CA); Josef Graetz, Erin (CA); Michael E. Nicholas, Beeton (CA)

(73) Assignee: Husky Injection Molding Systems Ltd. (CA)

( * ) Notice: Subject to any disclaimer, the term of this patent is extended or adjusted under 35 U.S.C. 154(b) by 182 days.

(21) Appl. No.: 10/194,684

(22) Filed: Jul. 13, 2002

(65) Prior Publication Data

US 2004/0009258 A1 Jan. 15, 2004

(51) Int. Cl.[7] .......................... B29C 49/06; B29C 49/64
(52) U.S. Cl. ...................... 425/526; 425/533; 425/534; 425/547
(58) Field of Search ................ 425/526, 529, 425/533, 534, 547

(56) References Cited

U.S. PATENT DOCUMENTS

| | | | | |
|---|---|---|---|---|
| 3,940,231 A | * | 2/1976 | Uhlig | 425/526 |
| 4,102,626 A | * | 7/1978 | Scharrenbroich | 425/526 |
| 5,176,871 A | | 1/1993 | Fukai | |
| 5,282,526 A | | 2/1994 | Gibbemeyer | |
| 5,447,426 A | | 9/1995 | Gessner et al. | |
| 5,837,299 A | * | 11/1998 | Bright et al. | 425/526 |
| 5,902,612 A | | 5/1999 | Ogihara | |
| 6,059,557 A | | 5/2000 | Ing et al. | |
| 6,146,134 A | * | 11/2000 | Kresak et al. | 425/526 |
| 6,186,736 B1 | | 2/2001 | Lust et al. | |
| 6,190,157 B1 | * | 2/2001 | Hofstetter et al. | 425/526 |
| 6,382,954 B1 | * | 5/2002 | Mai | 425/547 |
| 6,391,244 B1 | * | 5/2002 | Chen | 425/526 |
| 6,464,919 B2 | * | 10/2002 | Dubuis et al. | 425/526 |
| 6,488,878 B1 | * | 12/2002 | Neter et al. | 425/547 |

FOREIGN PATENT DOCUMENTS

| | | | | |
|---|---|---|---|---|
| EP | 700770 A2 | * | 3/1996 | B29C/49/64 |
| JP | 02034321 A | * | 2/1990 | B29C/49/64 |

* cited by examiner

*Primary Examiner*—Robert B. Davis
(74) *Attorney, Agent, or Firm*—Katten Muchin Zavis Rosenman

(57) ABSTRACT

A simplified perform handling device including an end-effector arranged to substantially conform, in use, to an end portion of a preform and to seal therewith. The device also includes an aligning jig to align the preform with the end-effector. The device provides improved preform thermal and angular orientation characteristics when used in a transfer apparatus of an injection blow molding system, or simplified end-of-arm tool for two-stage preform production. The device may also be operated to condition a preform retained on the injection mold core plate assembly of an injection mold.

71 Claims, 15 Drawing Sheets

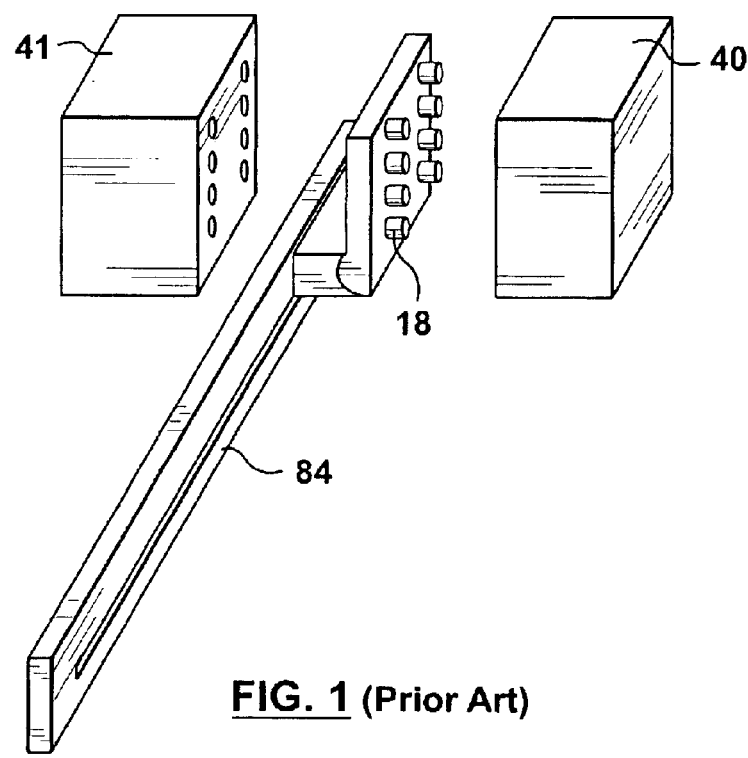
FIG. 1 (Prior Art)
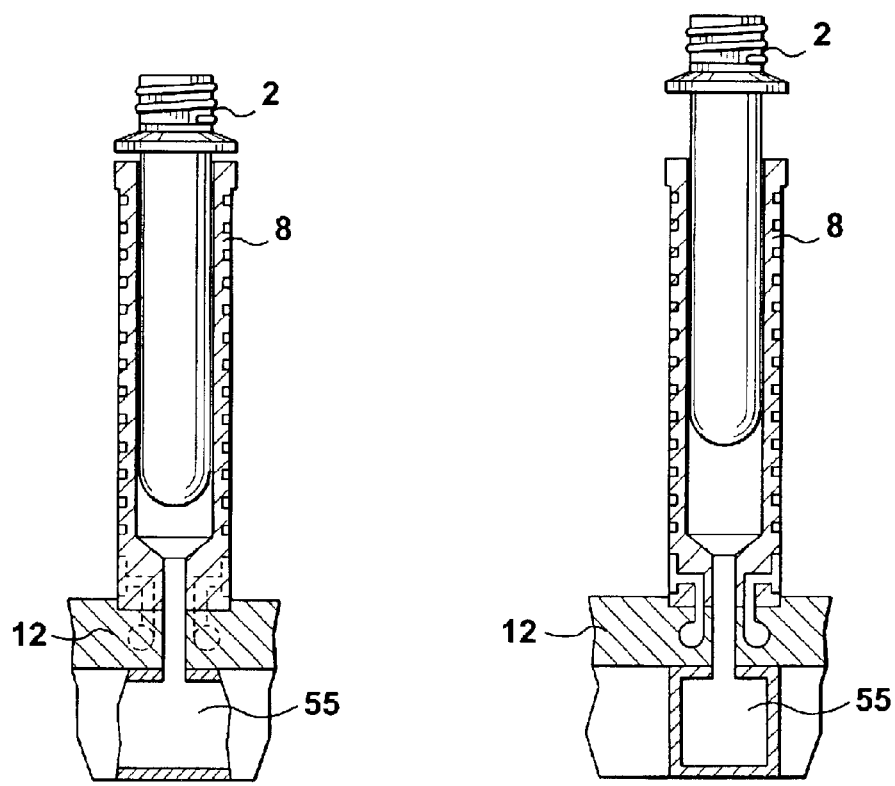
FIG. 2A (Prior Art)    FIG. 2B (Prior Art)

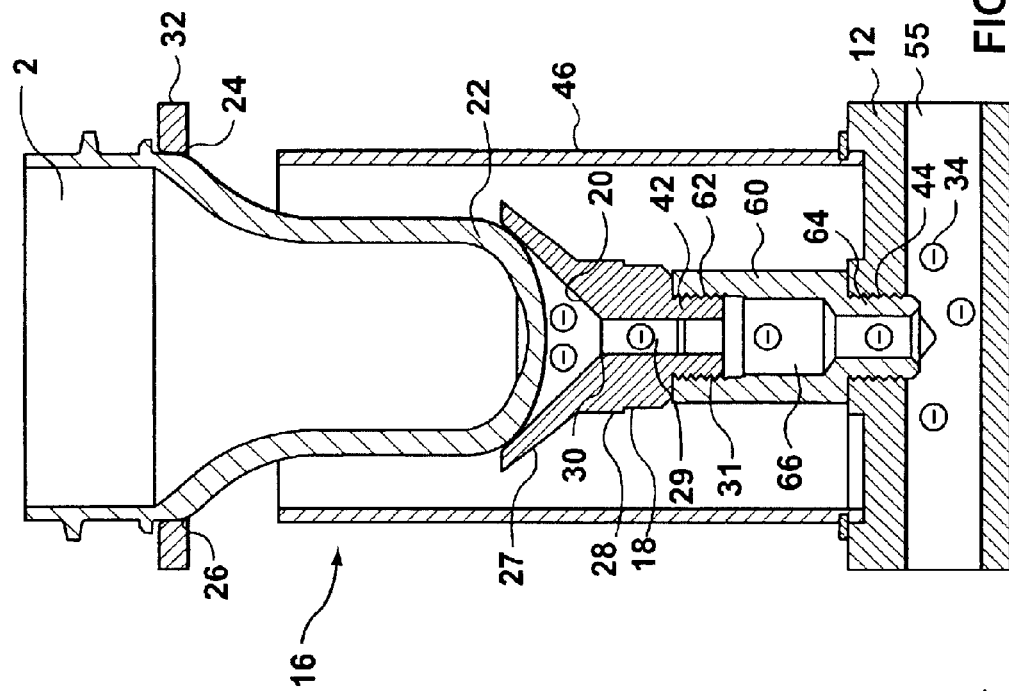
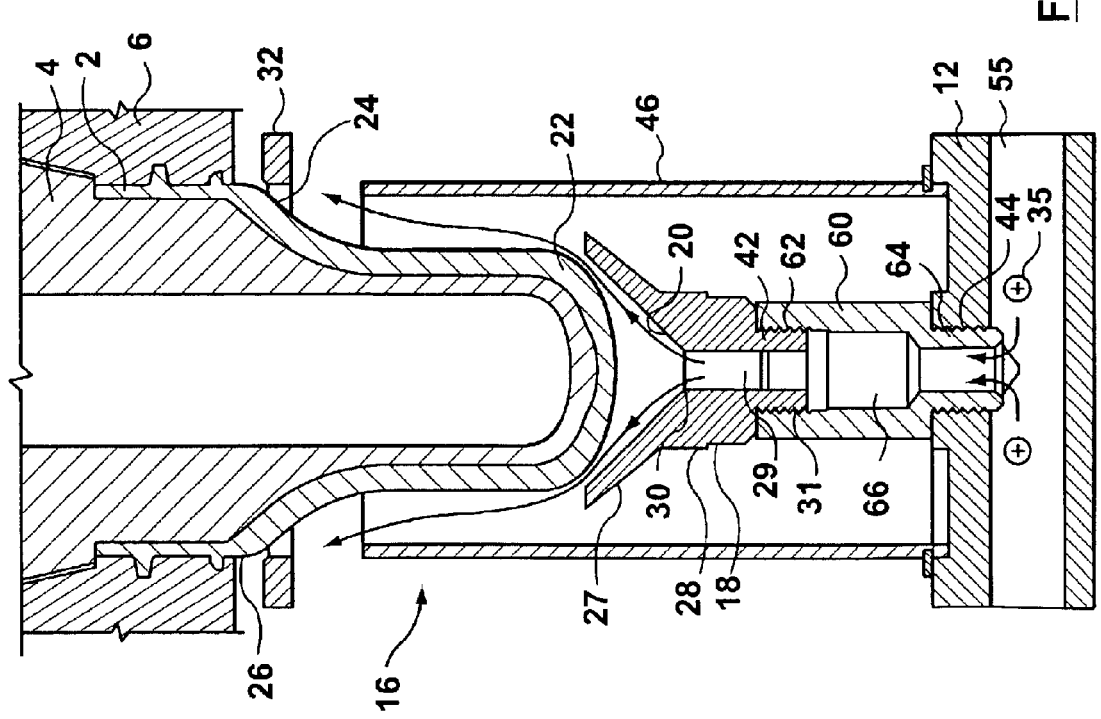

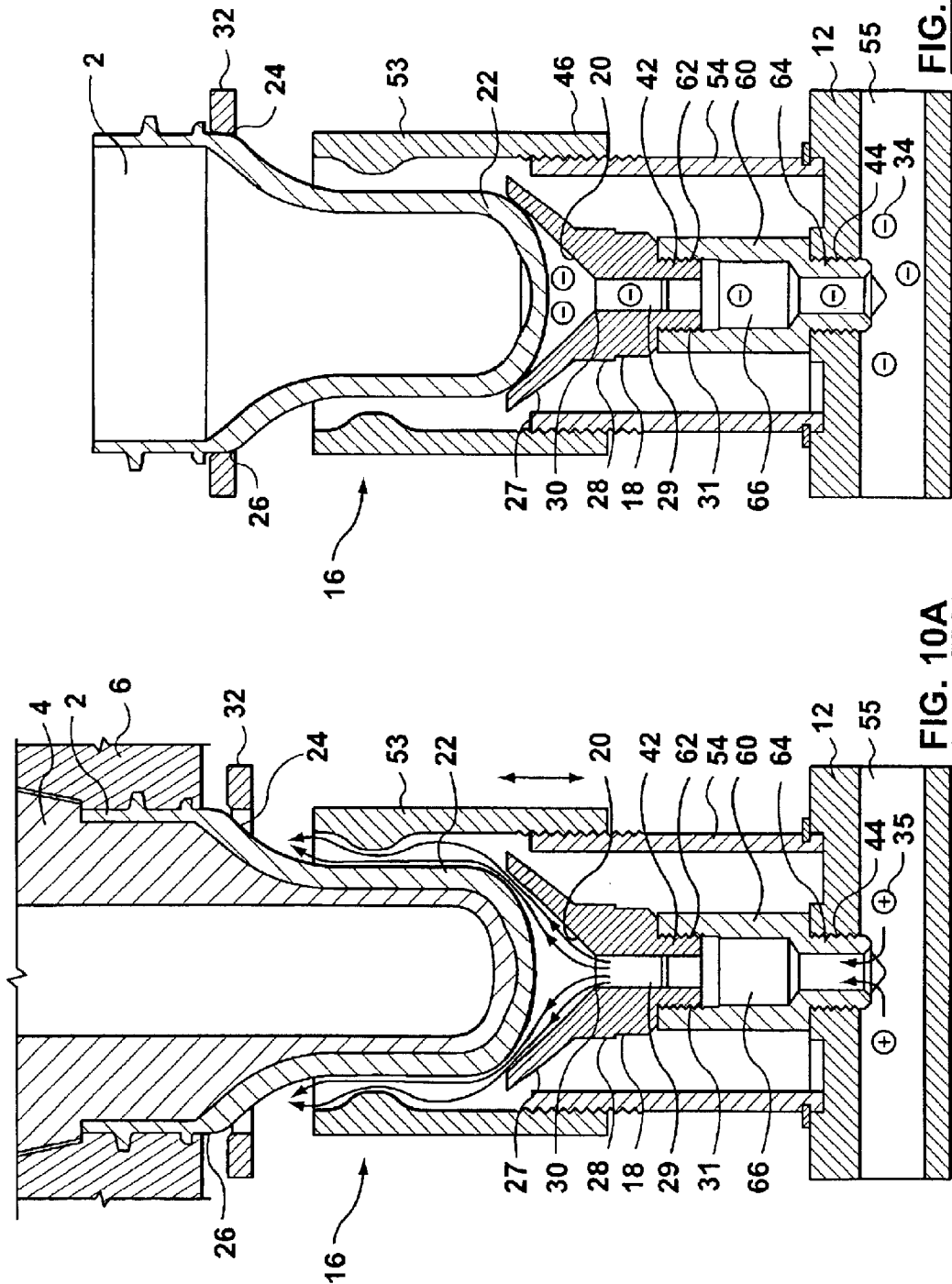

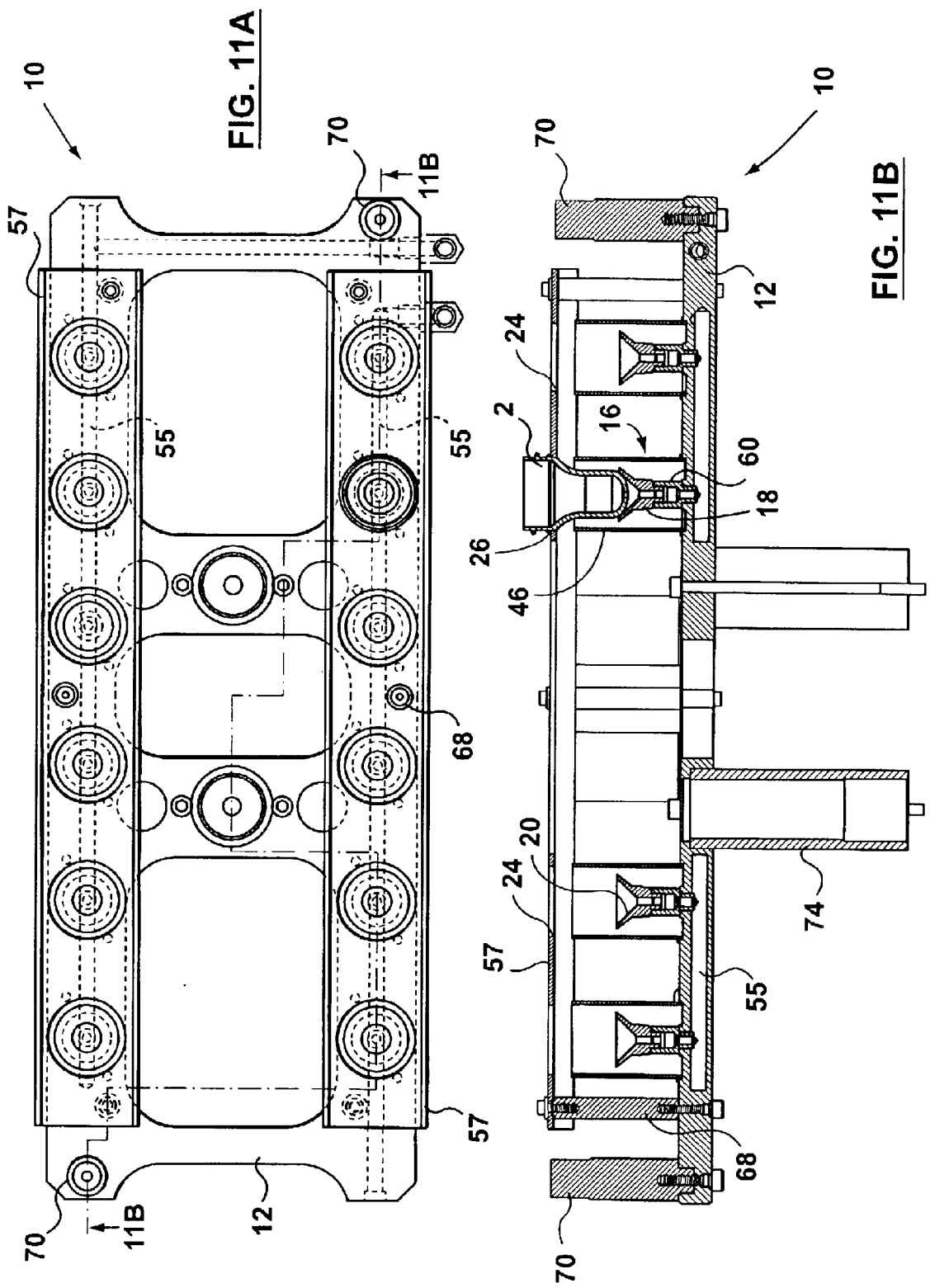

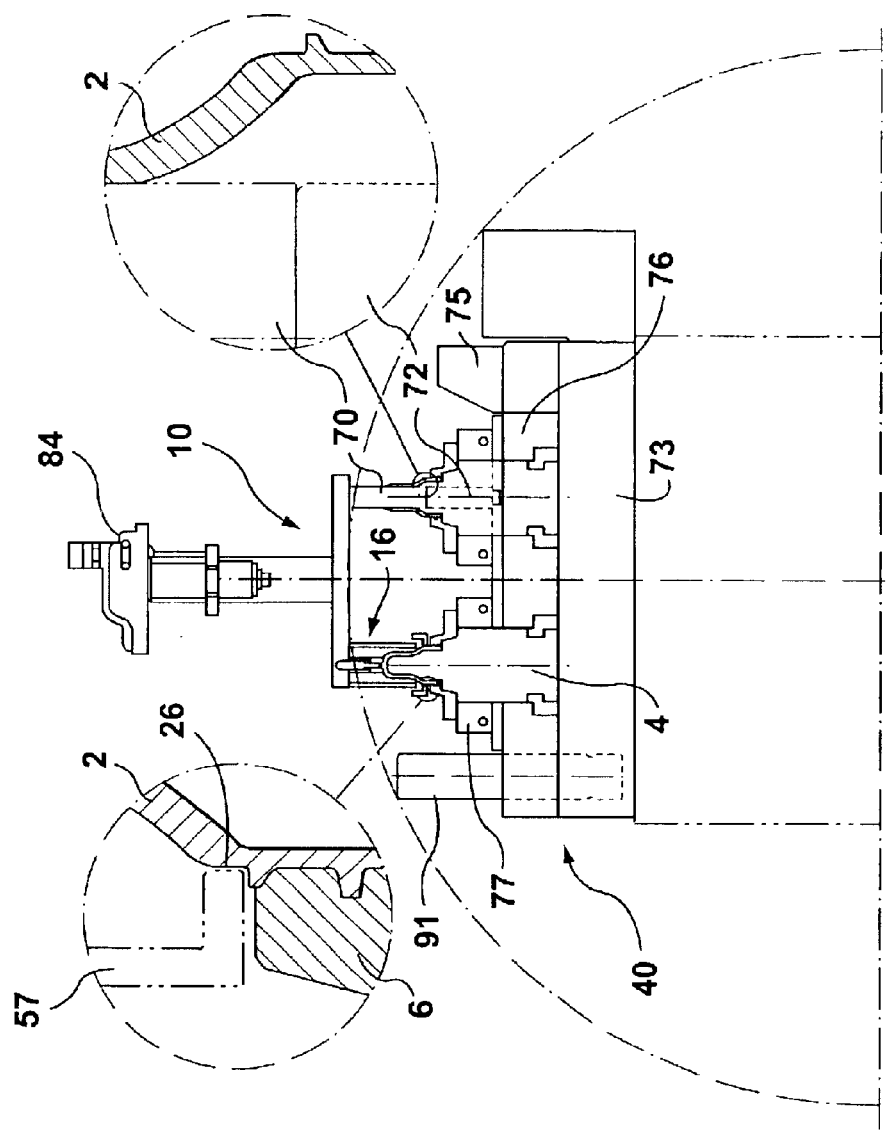
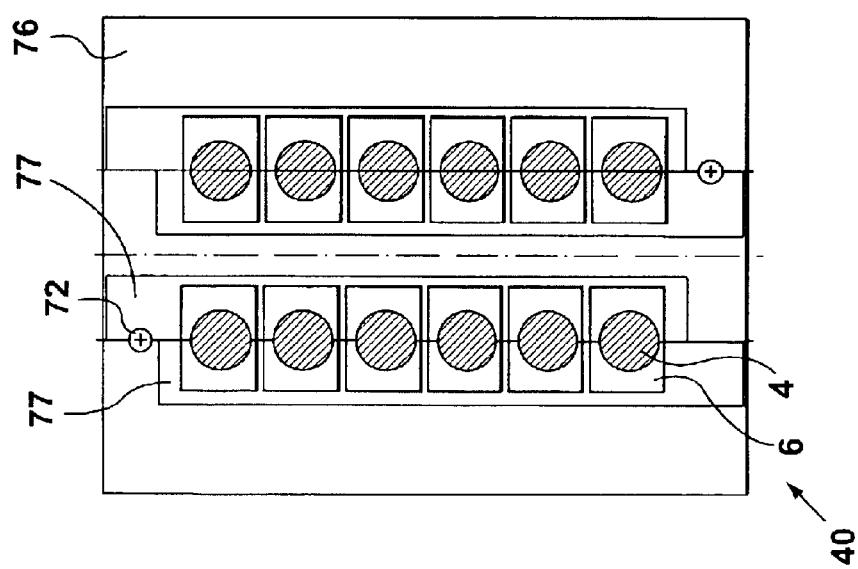
FIG. 12B
FIG. 12A

APPARATUS FOR HANDLING INJECTION MOLDED PREFORMS

BACKGROUND OF INVENTION

1. Field of the Invention

This invention is directed generally to an improved part handling apparatus for use with an injection molding machine, and specifically to improvements in a preform retaining assembly used on an end-of-arm tool for handling and optionally conditioning preforms.

2. Background Information

The prior art relating to devices for handling preforms from an injection mold address the problems of preform production for the two-stage manufacture of finished blow molded articles. In a two-stage process, the preform production step is separated from the blow molding step by at least the necessity to substantially reheat the preform prior to blow molding. Therefore, the process for the production of preforms is typically optimized to minimize the production cycle time, and hence most prior art handling devices are designed to minimize the requirements for in-mold cooling. As a result, prior art handling devices provide solutions to improve heat transfer and to increase available cooling time. The most broadly used handling devices of the prior art uses an end-of-arm tool with an array of water cooled and vacuum assisted preform carrier tube assemblies. In addition, the tool may have a multiple (i.e. typically two or three) of tubes to injection mold stacks to lengthen the available cooling time. The typical prior art preform carrier tube assembly includes a tube with a closed end, and a tube insert. The tube 8 structure, as shown in FIG. 2C, is typically made from heat conductive Aluminum, and includes a molding surface that matches or slightly interferes with the preform 2 outer body geometry, and has an outside groove for circulating cooling water. The tube insert 9 is typically made from heat conductive Aluminum and includes molding surface that closely matches that of the preform end-portion geometry, and further provides a ported connection to a vacuum source. The molding surface of the tube 8 and tube insert 9 provide for conductive cooling of the preform as well as for preserving the preform geometry while it is still in a malleable state. A disadvantage of the water cooled part handling devices is in terms of the expense for circulating chilled water, higher maintenance costs due to corrosion, leaks, deposit build-up, as well as the added design and manufacture complexity.

As an alternative to two-stage, a single-stage process on an injection-blow molding system may be used. A single-stage process is distinct from two-stage in that it relies on the latent heat within a preform from the injection molding step to at least partially enable the blow molding of the finished article in a directly coupled blow molding step. The preforms produced in a single-stage process are typically transferred between the steps of injection and blow by a transfer device that is intended to minimize heat transfer from the preforms and to preserve their heat distribution. The prior art transfer devices for use in a single-stage process fall within categories of: circulation of the preform within its neck mold; mechanical gripper assemblies that engage a preform neck portion; and vacuum-assisted carrier tube assemblies. The prior art vacuum-assisted carrier tube, as shown in FIG. 3, is distinct from that of two-stage in that it lacks a cooling means and provides minimal molding surface, and thereby substantially addresses the requirement for minimal heat transfer. A problem with the prior art tube assembly has been a difficulty in attaining a reliably airtight seal between the preform end-portion 22 and the tube insert 9, the seal precluded by the combination of a rigid molding surface on the tube insert 9 and the variances in preform 2 geometry (i.e shrinkage, process variations). An improper seal allows for currents of air to swirl past the preform and into the insert port, the air currents may impart a cooling pattern of cold streaks wherever there has been contact between the air currents and the preform. The cold streaks effectively disrupt the required heat distribution in the preform and may negatively influence down-stream blow molding. Another problem with the prior art carrier tube, as shown in FIG. 3, is a high cost of manufacture due to a close-tolerance fit between the molding surface of the tube insert and the preform end portion.

In a single-stage process it is also necessary for a preform engaged in the transfer device to be maintained in a substantially fixed alignment such that the open end of the preform may be reliably aligned and engaged on a retaining device of the blow molding machine when being transferred. A problem with prior art carrier tubes has been a difficulty in providing sufficient alignment when transferring the preform onto the retaining device.

It is necessary for the production of many articles to present the preform to the blow mold in a particular angular orientation. For example, orientation of a preform for blow molding operations is frequently required when a thread on a blown bottle or the like must be accurately located in order to position a closure thereon. The angular orientation of a preform from the injection mold to the blow mold may be either preserved or regained. Regaining of the angular orientation as taught in prior art usually involves the interaction of a physical feature on the preform with a mechanism on the blow molding machine. For example, a pawl on a conveyor may interact with a lug feature on the preform to stop the rotation of the preform in a specific orientation. Regaining the angular orientation of a preform requires an extra step in the process, can be complicated and expensive, and may dictate the inclusion of an otherwise unwanted reference feature on the preform. In a two-stage process the angular orientation must be regained. In an injection-blow molding system operating a single stage process with circulating neck molds the angular orientation of the preform is inherently preserved. However, many injection-blow molding systems do not easily accommodate circulation of the neck molds and therefore is not a universally applicable solution. Therefore without resort to neck mold circulation, maintaining a known angular orientation of the preform from injection mold to blow mold requires that the preform not have any rotational freedom while engaged with either the transfer device or the retaining device of the blow molding machine. The maintenance of angular orientation while on the retaining device notwithstanding, the prior art vacuum carrier tubes do not adequately restrict the rotation of the preform during the part transfer from the injection mold and thereafter onto the retaining device, the rotational retention precluded by the lack of any substantial cohesion between the tube insert molding surface and the preform end-portion.

U.S. Pat. No. 5,447,426 to Gessner et al. describes an improved take-off plate device for removing molded articles from a molding machine and delivering them to a transfer or receiving station. The device includes a plate, one or more tubes mounted to the plate for receiving molded articles. Each of the tubes is provided with a cooling passageway for effecting cooling of the molded articles as they are moved between the molding machine and the receiving station. A bottom plug, which is in contact with the cooling passageway, is provided in each tube to more efficiently cool an end portion of the molded article in the tube. Preferably, the bottom plug has an end surface that matches the shape of the molded article end portion.

U.S. Pat. No. 6,186,736 to Lust et al. describes a method for removing and transporting articles from a mold. The teachings of the patent relate to the use of a part handling device that includes the use of resilient bellows-type end effectors for the vacuum handling of contact lenses as shown in FIG. 1. The part handling device does not provide any auxiliary means to align the part.

Co-pending United States application Ser. No. 09/982,994 to Vardin et. al describes a method and apparatus for transferring preforms in an injection-blow mol ding machine The injection-molding machine is capable of creating multiple groups of preforms during an injection cycle that are then transferred by group to an indexable table on the blow-molding machine through the use of an robotically actuated end-of-arm tool that includes preform carrier tubes. The preforms being held in carrier tubes by application of a vacuum in a known manner.

U.S. Pat. No. 5,902,612 to Ogihara describes an injection-blow molding apparatus which includes an apparatus to transfer the preforms from the injection molding machine to the blow molding machine by way of a first transfer to a simple rigid supporting member that includes a depression for receiving the bottom and part of the body of a preform, and a second transfer by an inverting mechanism that relies on engaging the neck portion of the preform.

U.S. Pat. No. 5,176,871 to Fukai describes a method and apparatus of forcibly cooling and solidifying preforms from interior and exterior thereof including the use of cooling tubes. A preform released from an injection mold is transferred therefrom retained within its neck mold, the preform inserted into the cooling tube until the preform comes close to a guide member, a cooling core is also inserted into the preform. The cooling tube having a bottom opening and an upper opening through which cooling airflows.

U.S. Pat. No. 5,282,526 to Gibbemeyer describes a method for orientating container preforms. The apparatus disclosed uses a plurality of pallets which support pairs of rotating mandrels for moving preforms, closed end down, to and through an orientation station. At the orientation station, the preforms are rotated with the mandrels, via individual rotary drive means, until an individual pawl engages a notch on each preform. Each pawl engagement is detected by a limit switch on each mandrel. Once all the pawls are engaged, a bumper is lowered by an actuator to engage a brake assembly which, when engaged, prevents further rotation of the mandrels. After the first pawl engages the first notch, a slip clutch is used which allows the drive motor to continue to rotate while associated drive elements stop. The actuator is then retracted to allow the pallets and mandrels to be released. This apparatus is complex and requires that the pallets be stopped at the orientation stations for the individual stations to orientate the preform. The necessity to stop the pallets for orientation presents problems in incorporating this design into continuous motion automated systems. Due to the individualized treatment necessary for orientating each preform on each pallet, the orientation station includes a complex arrangement of moving parts. Also, because orientation takes place at a stopped position, orientation is a lengthier process than it would be with continuous motion machines.

U.S. Pat. No. 6,059,557 to 1 ng et al. describes a cooling device to be used with an index molding machine. The cooling device includes cooling tubes for receiving and cooling at least one molded part, which cooling tubes are mounted to a surface of a carrier plate connected to the frame, and an actuation device for moving the carrier plate. The cooling device also includes at least one blowing tube for blowing cool air onto the at least one molded part.

SUMMARY OF INVENTION

There exists a need for a simple preform handling device that is capable of releasably retaining a preform in a fixed alignment.

The present invention finds particular advantage in that it provides a device to retain a preform such that the device does not substantially disturb the preform heat distribution; eliminates preform differential cooling, and hence cold streaks are effectively avoided.

The present invention also finds particular advantage in that it provides a device to transfer a preform in a known angular orientation between the injection mold and a retaining device of a blow molding machine.

The present invention also finds particular advantage in that it provides a device for conditioning preforms while they are retained on the injection mold core plate assembly.

The present invention also finds particular advantage in that it provides a reduced-tolerance device that can accommodate a wide range of geometrical variations in the preform (i.e. due shrinkage or processing variations) without any negative impact on its performance.

The present invention also finds particular advantage in that it provides a device that can accommodate a wide range of preform designs with the replacement of a single component that is both inexpensive and easily replaced.

The present invention also finds particular advantage in an end-of-arm tool for handling preforms produced in an injection molding machine for the two-stage production of hollow plastic articles. The compact preform handling device of the present invention provides for an increase in the density of an array of the devices on the end-of-arm tool, and hence an increase in the multiple of preform shots, or stages, stored thereon. The increase in cooling time resulting from the extra stage will obviate, in some applications, the need for the water-cooled preform handling devices of the prior art. Cooling may be augmented by convective cooling incorporated by means of an air curtain circulating between the devices on the end-of-arm tool. Removing the requirement for cooling water in the end-of-arm tool, coupled with the relatively lightweight device of the present invention, reduces the operating weight of the tool and hence allows for a faster and less expensive actuating robot, and an overall simplified and less-expensive preform handling system. The device also reduces the requirements for alignment accuracy between the end-of-arm tool and injection mold for part transfer.

The present invention also finds particular advantage in that it provides a device for handling preforms that is easy to adjust for optimal operation and is easy to service.

According to an aspect of the present invention an end-of-arm tool for handling at least one preform is provided, the end-of-arm tool comprising a tooling base and at least one aligning coupler retained on the tooling base, the aligning coupler arranged to releaseably retain, in use, the at least one preform. An aligning coupler includes coupling means and alignment means, the coupling means arranged to substantially conform, in use, to an end portion of a preform and to couple therewith when retaining the preform, the coupling means returns to a neutral configuration when the preform is released, the alignment means engages a body portion of one of the at least one preform for aligning the preform with the coupling means.

In an embodiment of the present invention, the alignment means is an aligning surface of an opening in one of either an alignment jig or an alignment insert retained on an alignment jig. Further, the coupling means is a coupling surface on an end-effector.

In an embodiment of the present invention, the coupling surface is formed on a crown portion of the end-effector. The end-effector may further include a stem beneath the crown and a duct therethrough, a first opening of the duct intersects the coupling surface, and a second opening of the duct at a base of the stem, the end-effector arranged to couple and decouple, in use, the preform controlled by the application of negative or positive air pressure respectively through the first opening by means of an air pressure source connected to the second opening and acting through the duct. The end-effector may further include a neutral configuration of the coupling surface that is conical. The end-effector may also include a first connector on the stem for connection with a complementary connector on the tooling base.

Alternatively, the end effector may include a bellows section between the crown and the stem.

The end-effector is preferably formed from rubber. In a preferred embodiment of the present invention, the rubber is silicone.

In an embodiment of the present invention, the aligning coupler further includes a flow director surrounding the end-effector, the flow director arranged to temperature condition, in use, a preform retained on a injection mold core plate assembly of an injection mold by directing an airflow around a body portion of the at least one preform, the airflow being generated by the air pressure source acting through the first opening of the end-effector.

In an embodiment of the present invention, the flow director is a substantially straight-walled tube.

Alternatively, the flow director is a tube with an inner wall profiled to be substantially symmetrical and offset from the outer geometry of the preform.

Alternatively, the flow director is a tube with an inner wall including an annular projection.

Alternatively, the flow director includes a height adjustment means. The flow director further includes a flow head adjustably engaged on a support member.

In an embodiment of the invention, a plurality of the aligning couplers are arranged in at least one row on the tooling base. The tooling base may further include at least one manifold connecting the duct of each of the end-effectors in a row.

In an embodiment of the present invention, the alignment jig is a rail having a plurality of the alignment means thereon for each row of the aligning couplers.

Alternatively, the alignment jig is a plate having a plurality of the alignment means thereon.

In an embodiment of the present invention, the aligning coupler includes an end-effector support for connecting the end-effector to the tooling base. The end-effector support includes a first connector for receiving the first connector of the end-effector, a second connector for connecting to the complementary connector on the tooling base, and a duct therethrough. The end-of-arm tool further includes at least one alignment jig spacer spacing the alignment jig from the tooling base. The flow directors are connected to the tooling base. The tooling base further includes a bumper, the bumper arranged to interface, in use, with a complementary bumper on an injection mold to effect a coordination of movement between the injection mold stripper plate and the end-of-arm tool when transferring the preforms from the injection mold into the aligning couplers. The tooling base includes at least one robot spacer sleeve, the robot spacer sleeve arranged to provide, in use, an interface to a robotic actuator.

Alternatively, the flow director may be connected to the alignment jig.

According to a second aspect of the present invention an aligning coupler for use in an end-of-arm tool for handling a preform is provided, the aligning coupler comprising coupling means a nd alignment means, the coupling means arranged to substantially conform, in use, to an end portion of a preform and to couple therewith when retaining the preform, the coupling means returns to a neutral configuration when the preform is released, the alignment means engages a body portion of one of the at least one preform for aligning the preform with the coupling means.

In an embodiment of the present invention, the align ment means is an aligning surface of an opening in one of either an alignment jig or an alignment insert retained on an alignment jig. Further, the coupling means is a coupling surface on an end-effector In an embodiment of the present invention, the coup ling surface is formed on a crown portion of the end-effector. The end-effector may further include a stem beneath the crown and a duct therethrough, a first opening of the duct intersects the coupling surface, and a second opening of the duct at a base of the stem, the end-effector arranged to couple and decouple, in use, the preform controlled by the application of negative or positive air pressure respectively through the first opening by means of an air pressure source connected to the second opening and acting through the duct. The end-effector further characterized by a neutral configuration of the coupling surface that is conical. The end-effector may further include a first connector on the stem for connection with a complementary connector on a tooling base.

Alternatively, the end-effector may include a bellows section between the crown and the stem.

The end-effector is preferably formed from rubber. In a preferred embodiment of the present invention, the rubber is silicone.

In an embodiment of the present invention, the aligning coupler further includes a flow director surrounding the end-effector, the flow director arranged to temperature condition, in use, a preform retained on a injection mold core plate assembly of an injection mold by directing an airflow around a body portion of the at least one preform, the airflow being generated by the air pressure source acting through the first opening of the end-effector.

In an embodiment of the present invention, the flow director is a substantially straight-walled tube.

Alternatively, the flow director is a tube with an inner wall profiled to be substantially symmetrical and offset from the outer geometry of the preform.

Alternatively, the flow director is a tube with an inner wall including an annular projection.

Alternatively, the flow director includes a height adjustment means. The flow director further includes a flow head adjustably engaged on a support member.

In an embodiment of the present invention, the alignment jig is a rail having a plurality of the alignment means thereon.

Alternatively, the alignment jig is a plate having a plurality of the alignment means thereon.

In an embodiment of the present invention, the aligning coupler includes an end-effector support for connecting the end-effector to a tooling base. The end-effector support includes a first connector for receiving the first connector of the end-effector, a second connector for connecting to a complementary connector on a tooling base, and a duct therethrough.

According to a third aspect of the present invention an integrated injection molding and blow molding system for the production of hollow plastic articles is provided, the system comprising: an injection molding machine; a robotic actuator including an end-of-arm tool arranged to handle, in use, the at least one preform formed in the injection mold; and a blow molding machine.

The injection molding machine including: an injection unit arranged to provide, in use, a controlled flow of pressurized molten plastic; an injection mold clamp unit arranged to operate, in use, an injection mold between a mold open and a mold clamped position; the injection unit connected to the injection mold clamp unit to direct the flow of molten plastic into the injection mold in the clamped position for forming the at least one preform.

The blow molding machine arranged to operate, in use, a blow mold between a mold open and a mold clamped position, the blow mold receiving at least one preform, and for blowing the preform into the hollow plastic articles.

The end-of-arm tool including a tooling base and at least one aligning coupler retained on the tooling base, the aligning coupler arranged to releaseably retain, in use, the at least one preform. An aligning coupler includes coupling means and alignment means, the coupling means arranged to substantially conform, in use, to an end portion of a preform and to couple therewith when retaining the preform, the coupling means returns to a neutral configuration when the preform is released, the alignment means engages a body portion of one of the at least one preform for aligning the preform with the coupling means.

In an embodiment of the present invention, the alignment means is an aligning surface of an opening in one of either an alignment jig or an alignment insert retained on an alignment jig. Further, the coupling means is a coupling surface on an end-effector.

In an embodiment of the present invention, the coupling surface is formed on a crown portion of the end-effector. The end-effector may further include a stem beneath the crown and a duct therethrough, a first opening of the duct intersects the coupling surface, and a second opening of the duct at a base of the stem, the end-effector arranged to couple and decouple, in use, the preform controlled by the application of negative or positive air pressure respectively through the first opening by means of an air pressure source connected to the second opening and acting through the duct. The end-effector further characterized by a neutral configuration of the coupling surface that is conical. The end-effector may further include a first connector on the stem for connection with a complementary connector on the tooling base.

Alternatively, the end-effector may include a bellows section between the crown and the stem.

The end-effector is preferably formed from rubber. In a preferred embodiment of the present invention, the rubber is silicone.

In an embodiment of the present invention, the aligning coupler further includes a flow director surrounding the end-effector, the flow director arranged to temperature condition, in use, a preform retained on a injection mold core plate assembly of an injection mold by directing an airflow around a body portion of the at least one preform, the airflow being generated by the air pressure source acting through the first opening of the end-effector.

In an embodiment of the present invention, the flow director is a substantially straight-walled tube.

Alternatively, the flow director is a tube with an inner wall profiled to be substantially symmetrical and offset from the outer geometry of the preform.

Alternatively, the flow director is a tube with an inner wall including an annular projection.

Alternatively, the flow director includes a height adjustment means. The flow director further includes a flow head adjustably engaged on a support member.

In an embodiment of the invention, a plurality of the aligning couplers are arranged in at least one row on the tooling base. The tooling base may further include at least one manifold connecting the duct of each of the end-effectors in a row.

In an embodiment of the present invention, the alignment jig is a rail having a plurality of the alignment means thereon for each row of the aligning couplers.

Alternatively, the alignment jig is a plate having a plurality of the alignment means thereon.

In an embodiment of the present invention, the aligning coupler includes an end-effector support for connecting the end-effector to the tooling base. The end-effector support includes a first connector for receiving the first connector of the end-effector, a second connector for connecting to the complementary connector on the tooling base, and a duct therethrough. The end-of-arm tool further includes at least one alignment jig spacer spacing the alignment jig from the tooling base. The flow directors are connected to the tooling base. The tooling base further includes a bumper, the bumper arranged to interface, in use, with a complementary bumper on an injection mold to effect a coordination of movement between the injection mold stripper plate and the end-of-arm tool when transferring the preforms from the injection mold into the aligning couplers. The tooling base includes at least one robot spacer sleeve, the robot spacer sleeve arranged to provide, in use, an interface to a robotic actuator.

Alternatively, the flow director may be connected to the alignment jig.

BRIEF DESCRIPTION OF THE DRAWINGS

FIG. 1 is an isometric view of a prior art part handling apparatus, for use with an injection molding machine, that incorporates bellows-type end-effectors;

FIGS. 2A, 2B and 2C are section views of prior art preform carrier tube assembly for use on an end-of-arm tool for handling and conditioning preforms retrieved from an injection molding machine;

FIG. 8A is a section view of an embodiment of the aligning coupler of the present invention, shown in operation conditioning a preform retained on the injection mold core plate assembly;

FIG. 8B is a section view of an embodiment of the aligning coupler of the present invention, shown in operation with a preform retained therein;

FIG. 10A is a section view of an alternative embodiment of the aligning coupler of the present invention, shown in operation conditioning a preform retained on the injection mold core plate assembly;

FIG. 10B is a section view of an alternative embodiment of the aligning coupler of the present invention, shown in operation with a preform retained therein;

FIG. 11A is a plan of an embodiment of the end-of-arm tool of the present invention;

FIG. 11B is section view along line 11B—11B of FIG. 11A of an embodiment of the end-of-arm tool of the present invention;

FIG. 12A is a plan view of the injection mold core plate assembly of an injection mold including an interface for an embodiment of the end-of-arm tool of the present invention;

FIG. 12B is a partial exploded side view of the injection mold core plate assembly of the injection mold engaged with the end-of-arm tool of the present invention for part transfer;

DETAILED DESCRIPTION

Figure 2C:
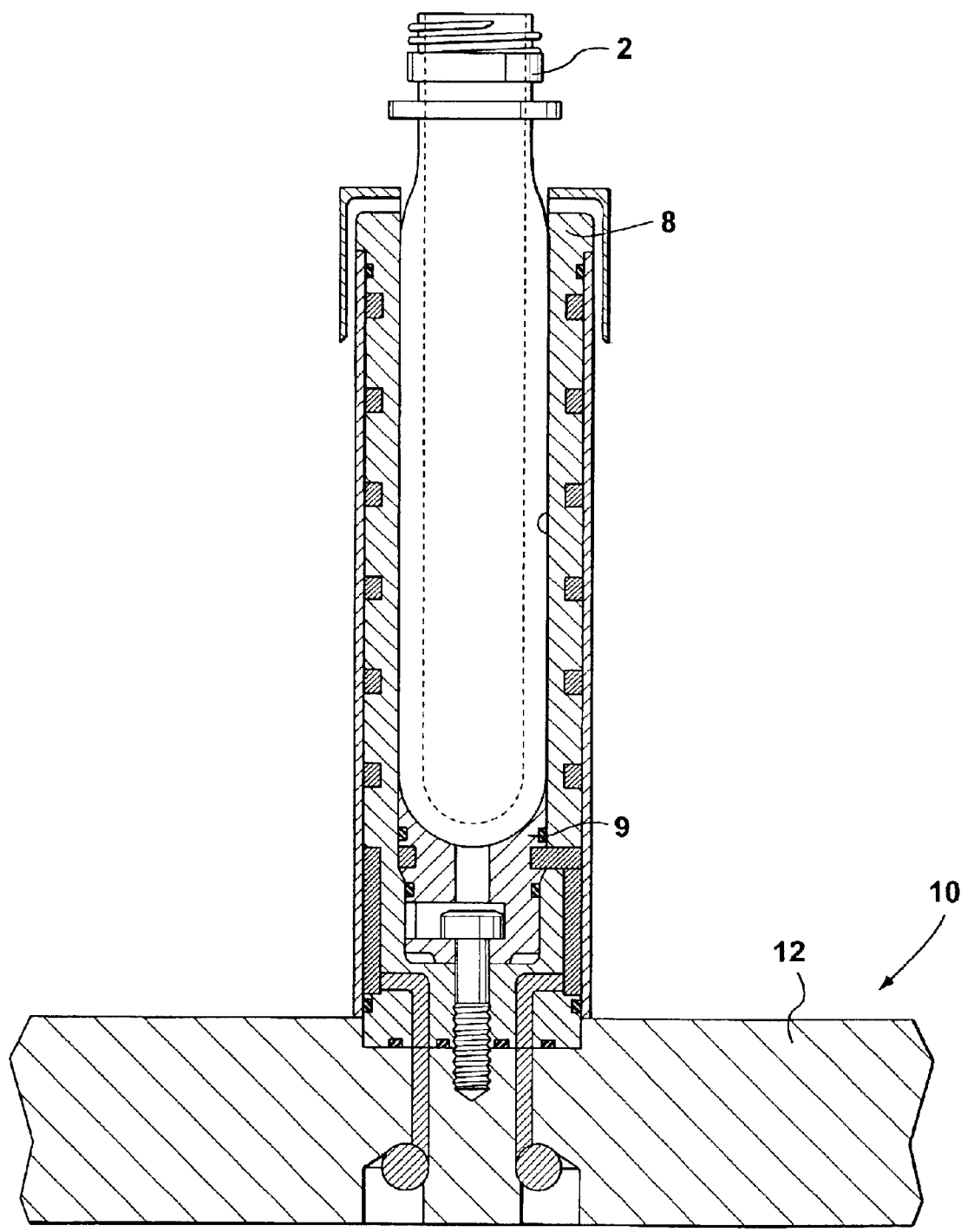
Figure 3:
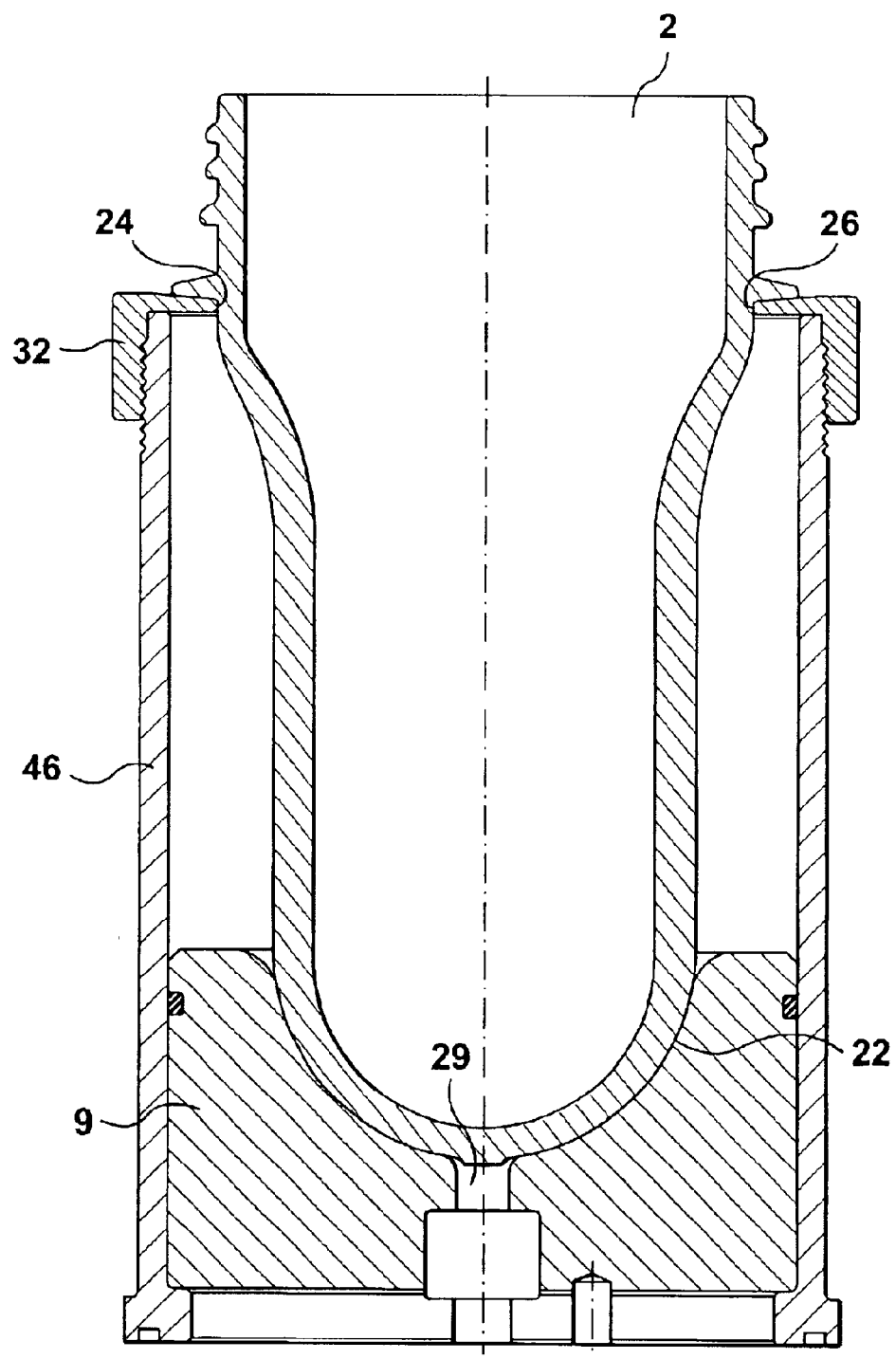
FIG. 3 is a section view of a prior art preform handling tube for use on an end-of-arm tool for transferring preforms between an injection molding and a blow molding machine.
Figure 4:
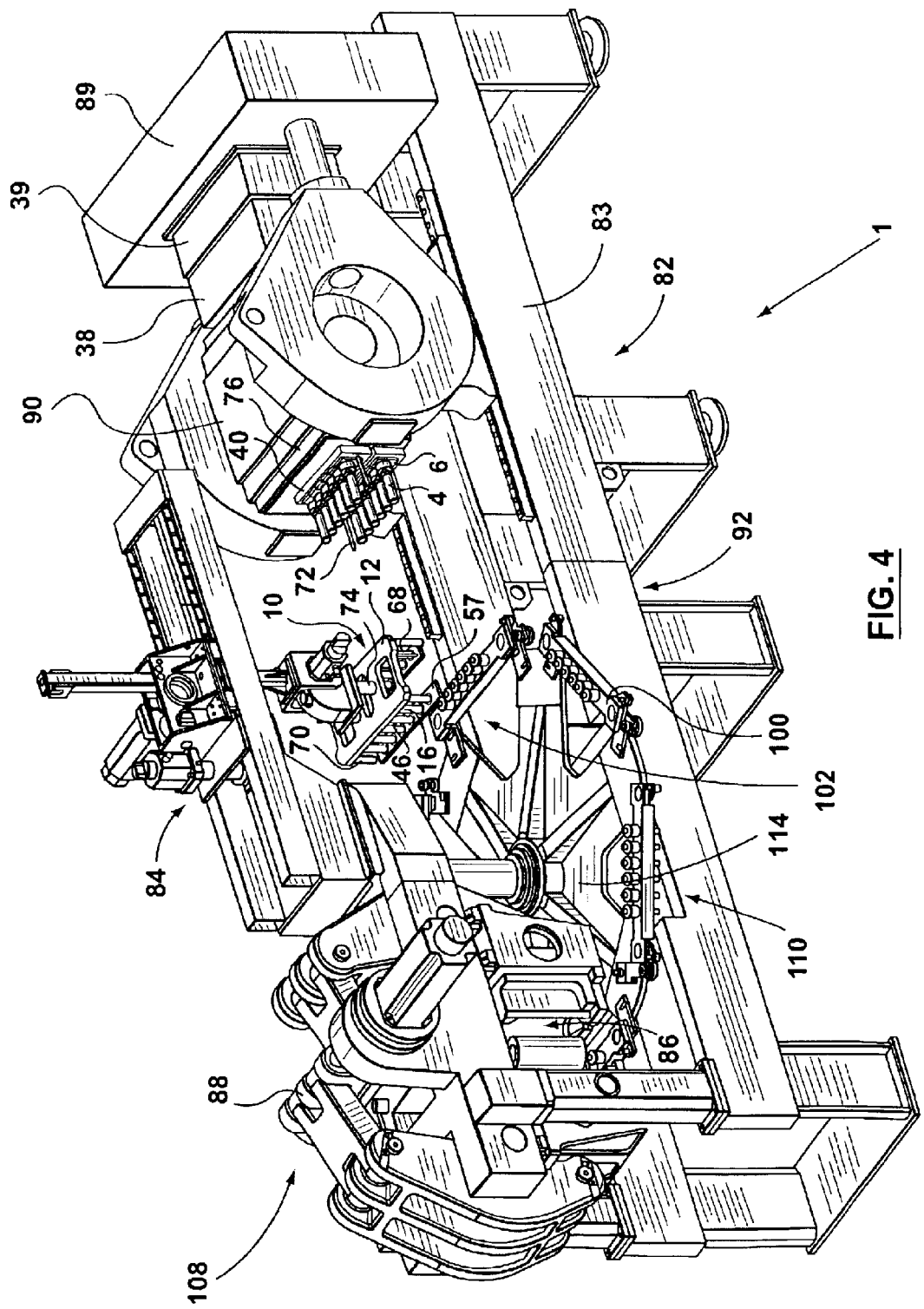
FIG. 4 is an isometric view of an integrated injection and blow molding machine illustrating the integration of the end-of-arm-tool of the present invention.
Figure 5:
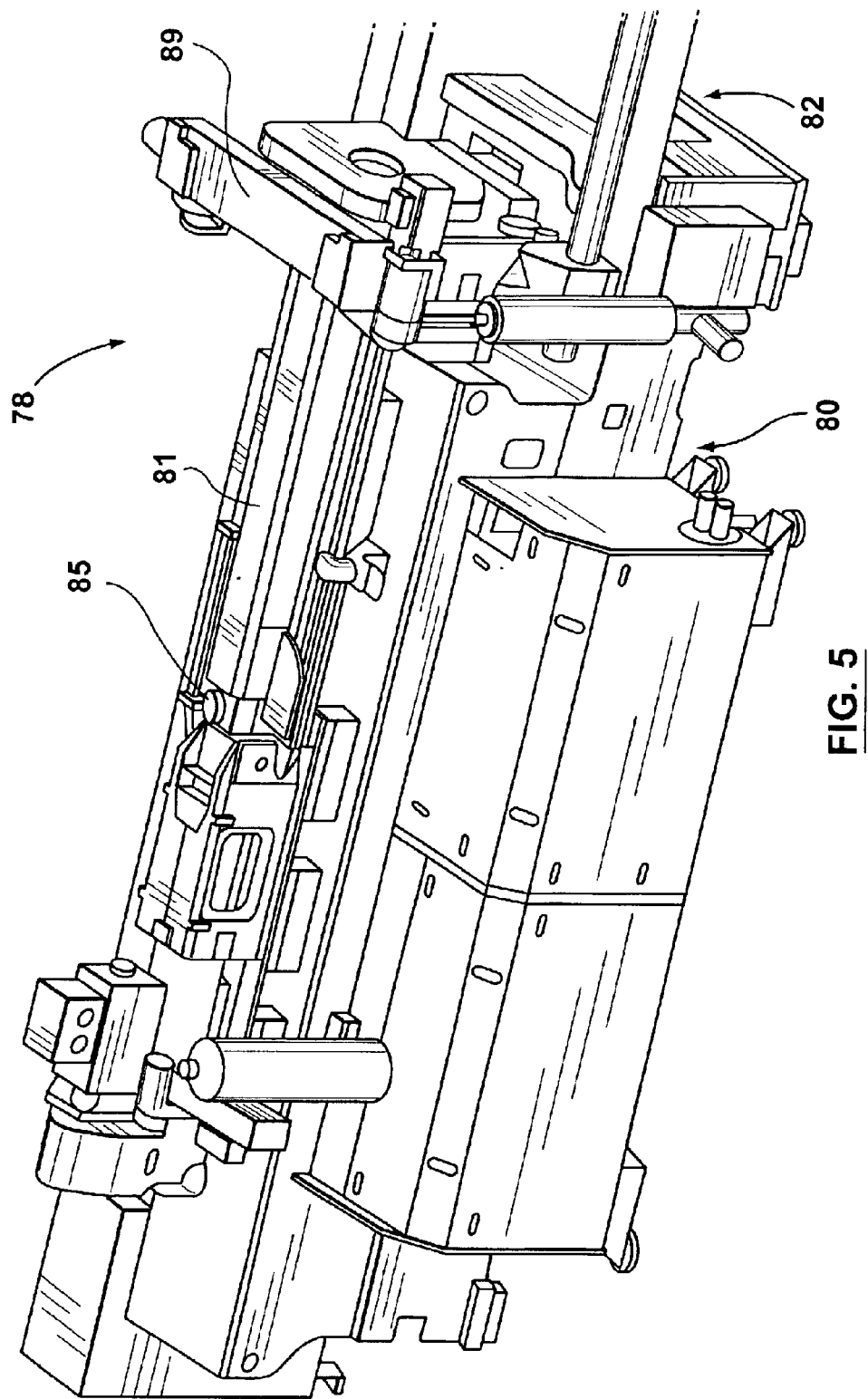
FIG. 5 is an isometric view of an injection unit for use with the injection-blow molding system of FIG. 4.

Referring to the drawings, FIG. 4 and FIG. 5 illustrate an injection blow molding system, generally indicated at 1, for the production of hollow plastic articles, the system comprising an index injection molding machine 78 coupled with a blow molding machine, generally indicated at 92.

The index injection molding machine comprises an injection unit 80 and an injection mold clamp unit 82.

The injection unit, generally indicated at 80, arranged to provide a controlled flow of pressurized molten plastic in a known manner; plastic resin entering the unit at the feed throat 85 is heated and pressurized in the injection barrel 81 by a screw (not shown) and thereafter injected through nozzle (not shown) and into an adjacent injection mold 38.

The injection mold clamp unit 82 containing a dual index injection mold 38 having two injection mold core plate assemblies 40 mounted on opposing faces of a rotatable and translatable index block 90, the corresponding injection mold hot-half 39 mounted to a stationary platen 89. In operation, the index block 90 is positioned and clamped to engage an injection mold core plate assembly 40 with the injection mold hot-half 39 for production of a shot of preforms 2 during a molding operation, concurrently the injection mold core plate assembly on the opposite side of the index block 90 is in an auxiliary position for post-molding operations, alternately, the index block 90 is positioned to allow for a 180° index block 90 rotation thereby interchanging the injection mold core plate assemblies 40 between the molding and post-molding orientations. The post-molding operations may include thermal conditioning of the shot of preforms 2 retained on the injection mold core plate assembly 40 and preform 2 transfer therefrom.

The injection mold further includes molding cavities defined by a set of molding inserts including a core 4 forming the inner preform geometry, a neck ring pair 6 for forming the outer preform neck portion, and a cavity insert (not shown) for forming the remainder of the outer preform body geometry. The core 4, and neck ring pair 6 are included in the injection mold core plate assembly 40, the cavity insert (not shown) included in the injection mold hot half 39. The core plate assembly 40 further includes a stripper plate 76 and slide pairs 77, for operating the neck ring pair 6 in the known manner for ejecting preforms 2. In the embodiment shown, each injection mold core plate assembly 40 has twelve mold cores 4 thereon, however, any suitable number of mold cores 4 could be provided.

Attached to the rear of the injection mold clamp unit base 83 is a blow molding machine 92, the blow molding machine 92 includes, a robotic actuator 84 with an end-of-arm tool 10 thereon, a six position horizontal table 114 with preform carrying pallets 100 mounted at each of six equal-spaced positions, and an electric servo driven blow clamp 88. The table 114 rotatable between six stations that are in order of operation: a loading station, generally indicated at 102, at which the end-of-arm tool 10 loads a set of preforms 2 onto the individual carrying pallets 100; a first and a second thermal conditioning station (not shown) for adjusting the thermal profile of the set of preforms 2 where necessary; a blow molding station 108 at which the blow clamp 88 is located for operating a blow mold 86 to stretch-blow mold the set of preforms 2 into hollow plastic articles 3; an open station 110; and finally a stripper station (not shown) for removing the blown articles 3 from the pallets 100. Alternative embodiments of the blow molding machine 92 may have any suitable number of positions on the horizontal table 114 rotatable between any suitable number of stations.

The post-molding operations being provided by the end-of-arm tool 10 operating between the injection mold core plate assembly 40 in the auxiliary position on the index block 90, and the carrying means 100 on the blow molding machine 92. The end-of-arm tool 10 including an array of aligning couplers, generally indicated at 16, alternately operable to provide: the thermal conditioning of the shot of preforms 2 on the injection mold core plate assembly 40; receive the shot of preforms 2 being ejected from the injection mold core plate assembly 40; retain the shot of preforms 2 during a handling operation to the carrying pallet 100; and ejecting at least a set of the shot of preforms 2 onto the carrying pallet 100. The injection mold core plate assembly 40 further includes several bumpers 72 to interact with complementary bumpers 70 on the end-of-arm tool to synchronize the motion of the end-of-arm tool 10 with the injection mold core plate assembly 40 during the transfer of the shot of preforms 2.

Referring to FIG. 12A and FIG. 12B, the injection mold core plate assembly 40 is shown including a core plate 73 and a stripper plate 76 linked by a set of leader pins 91. The injection mold core plate assembly 40 further includes two sets of slide pairs 77 arranged to be slideably operable on the stripper plate 76 by a linkage including a set of cam followers 79 (shown in FIG. 13A and FIG. 13B) connected to the slide pair 77 and engaged in the tracks of cams 75 mounted to the core plate 73. The injection mold core plate assembly 40 further includes two bumpers 72 mounted to the stripper plate 76 for engaging a complementary set of bumpers 70 on the end-of-arm tool 10. The injection mold core plate assembly 40 further includes a set of molding inserts, each set including a neck ring pair 6 mounted on a slide pair 77 and a core 4 mounted to the core plate 73. During ejection, the stripper plate 76 is stroked forward by ejectors (not shown) housed in the index block 90, the stripper plate 76 motion causes each slide pair 77 to diverge as dictated by cam followers 79 (shown in FIG. 13A and FIG. 13B) engaged in the tracks of cams 75, and therefore each preform 2 being engaged by its neck ring pair 6 is pushed from its core 4 until the neck ring pair 6 have diverged sufficiently to clear the largest diametrical feature of the preforms 2.

FIG. 12B further illustrates the position and interaction of the end-of-arm tool 10 at the beginning of preform 2 ejection from the injection mold 38 and transfer into the aligning coupler, generally indicated at 16, of the end-of-arm tool 10. The interaction of the bumpers 70 and 72 establishes a spaced relationship between the preform 2 and the aligning coupler 16, such that: an interference fit is established between a coupling means provided by a resilient end-effector 18 of the aligning coupler 16, and an end-portion 22 of a preform 2; a body portion 26 of the preform 2 is engaged by an aligning means provided by an alignment jig 32 of the aligning coupler 16. The interaction of the bumpers 70 and 72 further provide for the synchronized travel of the aligning couplers 16, with the preforms 2 during ejection.

Figure 13A:
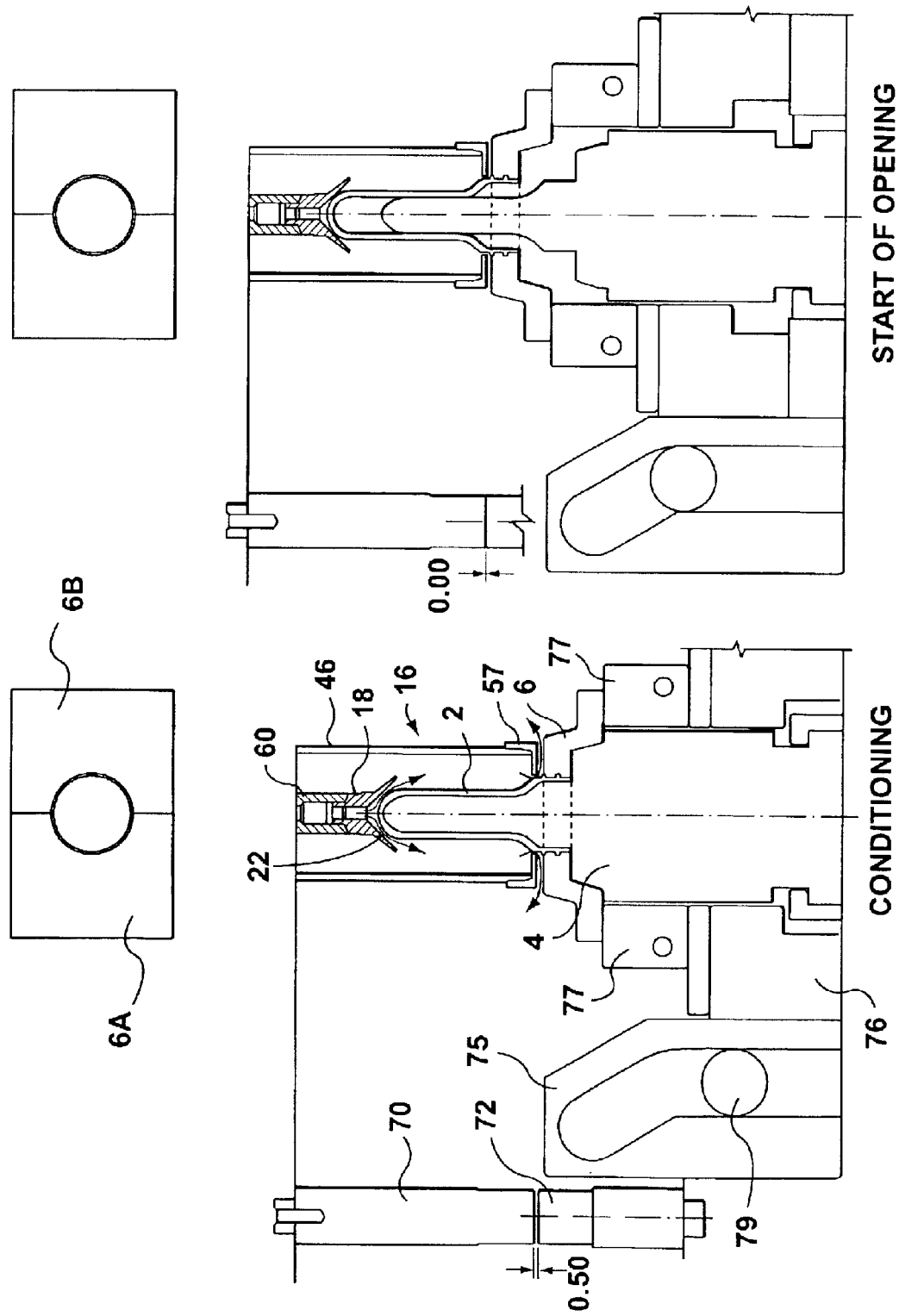
FIGS. 13A and 13B illustrate the post-molding operations of preform thermal conditioning and transfer between the injection mold and the end-of-arm tool of the present invention.
Figure 13B:
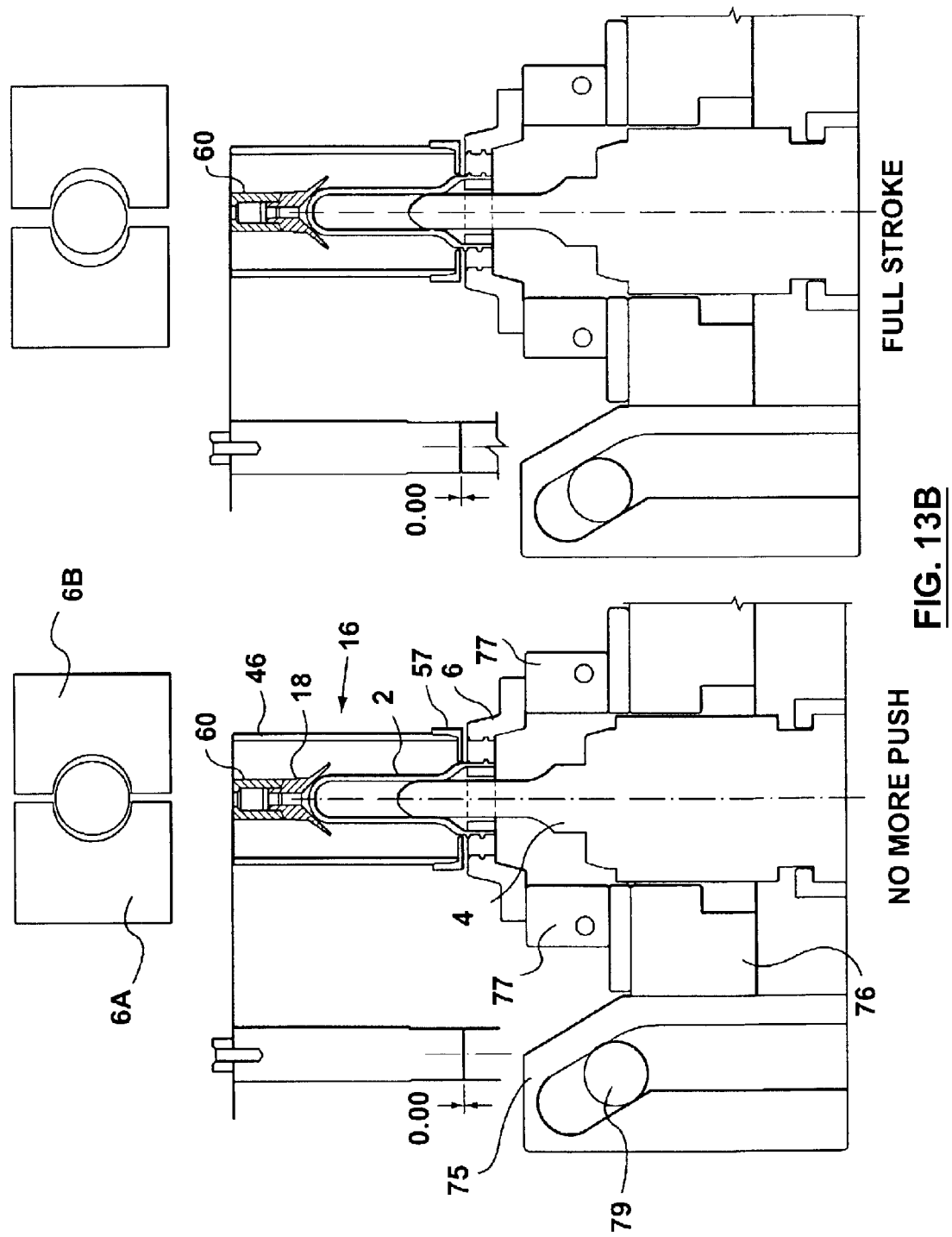

FIGS. 13A and 13B illustrate the post-molding operations of preform 2 thermal conditioning and transfer. The sequence begins with preform 2 thermal conditioning. During the thermal conditioning operation, the end-of-arm tool 10 (shown in FIG. 4 and FIG. 12B) is positioned by the robotic actuator 84 (shown in FIG. 4) such that the array of aligning couplers, generally indicated at 16, thereon are in longitudinal alignment with the shot of preforms 2 retained on the injection mold core plate assembly 40 (shown in FIG. 4 and FIG. 12B), with a clearance gap between the end-effector 18 of an aligning coupler and the end portion 22 of a preform 2. The thermal conditioning is provided by convective heat transfer with an airflow, as represented by the arrows, established between the preform 2 outer body and a flow director 46 of the aligning coupler 16, the airflow being emitted from the end-effector 18. The next frame in the sequence illustrates the beginning of the neck ring pair 6 opening after an initial fraction of ejection stroke. The preform 2 having been pushed a corresponding distance along core 4 by the neck ring pair 6 while being retained in the aligning coupler 16, from the point that the initial gap (e.g. 0.50 mm) between the bumpers 70 and 72, shown during conditioning, was closed. The next frame in the sequence illustrates the point in the ejection stroke that the neck ring pair 6 have opened sufficiently that the preform 2 is no longer being pushed along the core 4 by neck ring pair 6. At this point only a vacuum being applied through the end-effector 18 is retaining the preform 2 in the aligning coupler. The final frame in the sequence illustrates the full extent of the ejection stroke and the point at which the robotic actuator 84 (shown in FIG. 4) is signaled to retract the end-of-arm tool 10 (shown in FIG. 4 and FIG. 12B), with the shot of preforms 2 thereon, before the stripper plate 76 (shown in FIG. 4 and FIG. 12B) retracts.

Referring to FIGS. 11A and 11B, an embodiment of the end-of-arm tool, generally indicated at 10, is shown. The end-of-arm tool includes a tooling base 12 with a set of end-effectors 18 in rows thereon at a matching pitch and quantity to that of the injection cores 4 (shown in FIG. 4) on the injection mold core plate assembly 40 (shown in FIG. 4). Each end-effector 18 being threadably connected to an end-effector support 60 that is in turn threadably connected to the tooling base 12. The end-of-arm tool 10, further includes several alignment rails 57. Each alignment rail 57 includes a row of regularly spaced openings therethrough, the spacing matches the pitch between cores in a corresponding row on the injection mold core plate assembly 40. Each opening defines an aligning surface 24 for engaging a body portion 26 of the preform 2 when the preform 2 is coupled in the end-effector 18. The alignment rails 57 are attached to the tooling plate 12 by alignment jig spacers 68 such that the aligning surfaces 24 are in centered alignment with the corresponding end-effector 18. The end-of-arm tool further includes a set of flow directors 46. Each flow director 46 comprises a tube fastened in centered alignment with the end-effector 18 on the tooling base 12. In cooperation, the end-effector 18, aligning surface 24, and flow director 46 provide the aligning coupler, generally indicated at 16. The tooling plate further including several manifolds 55 for connecting the end-effectors 18 in each row to a common air pressure source 34, 35. The tooling base 12 includes bumpers 70 mounted adjacent the alignment rails 57 for interfacing with the corresponding bumper 72 of the injection mold core plate assembly 40. The tooling base 12 includes robot spacer sleeves 74 to mount the end-of-arm tool 10, to the robotic actuator 84 (shown in FIG. 4).

Figure 15A:
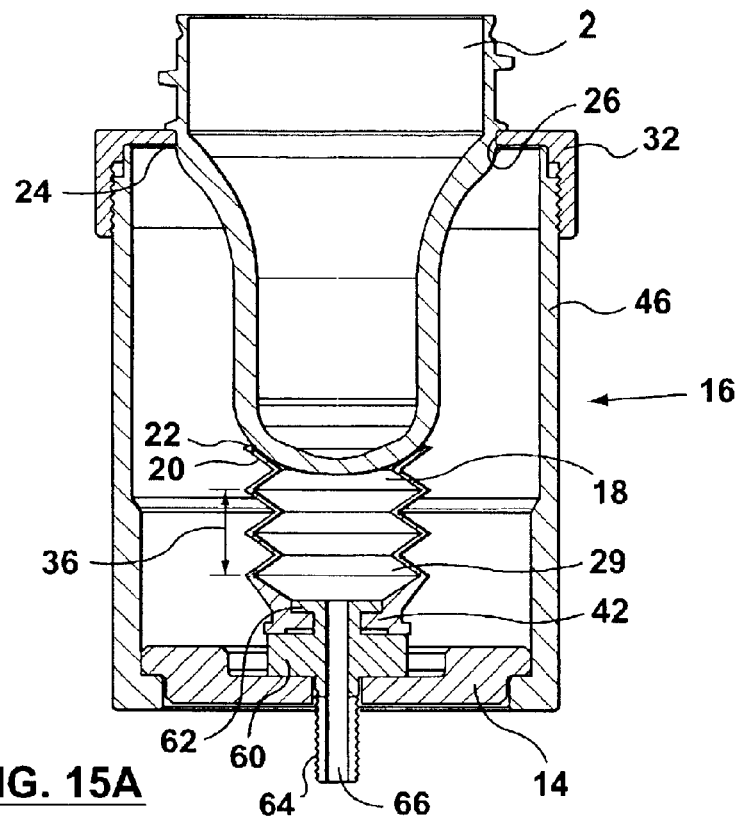
FIG. 15A is a plan view of an alternative embodiment of the aligning coupler of the present invention.
Figure 15B:
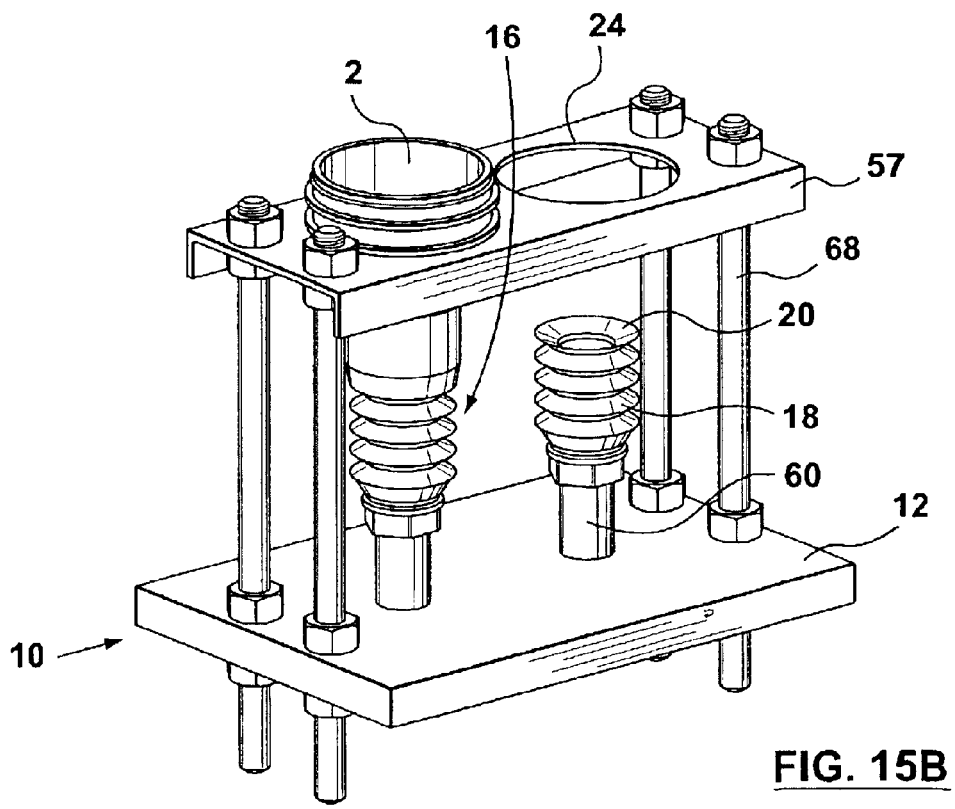
FIG. 15B is a side view of the alternative embodiment of the end-of-arm tool.

Referring to FIG. 15B, an alternative embodiment of the end-of-arm tool, generally indicated at 10, is shown. The end-of-arm tool 10 includes a tooling base 12 with a set of end-effectors 18 in a row thereon at a matching pitch and quantity to that of the injection cores 4 (not shown) on the injection mold core plate assembly 40 (not shown). The end-effectors 18 of this embodiment further include a bellows section 36 (shown in FIG. 15A). Each end-effector 18 being connected to an end-effector support 60 that in turn is connected to the tooling base 12. The end-of-arm tool 10 further includes an alignment rail 57. The alignment rail 57 includes a row of regularly spaced openings therethrough, the spacing matches the pitch between cores in a corresponding row on the injection mold core plate assembly 40 (not shown). Each opening defines an aligning surface 24 for engaging a body portion 26 (shown in FIG. 15A) of the preform 2 when the preform 2 is coupled in the end-effector 18. In cooperation, the end-effector 18 and aligning surface 24 provide the aligning coupler, generally indicated at 16. The alignment rails 57 are attached to the tooling plate 12 by alignment jig spacers 68 such that the aligning surfaces 24 are in alignment with the corresponding end-effector 18; the alignment jig spacers 68 are threaded rods with pairs of nuts thereon for adjustably fastening with the alignment rail 57 and tooling base 12.

Figure 14A:
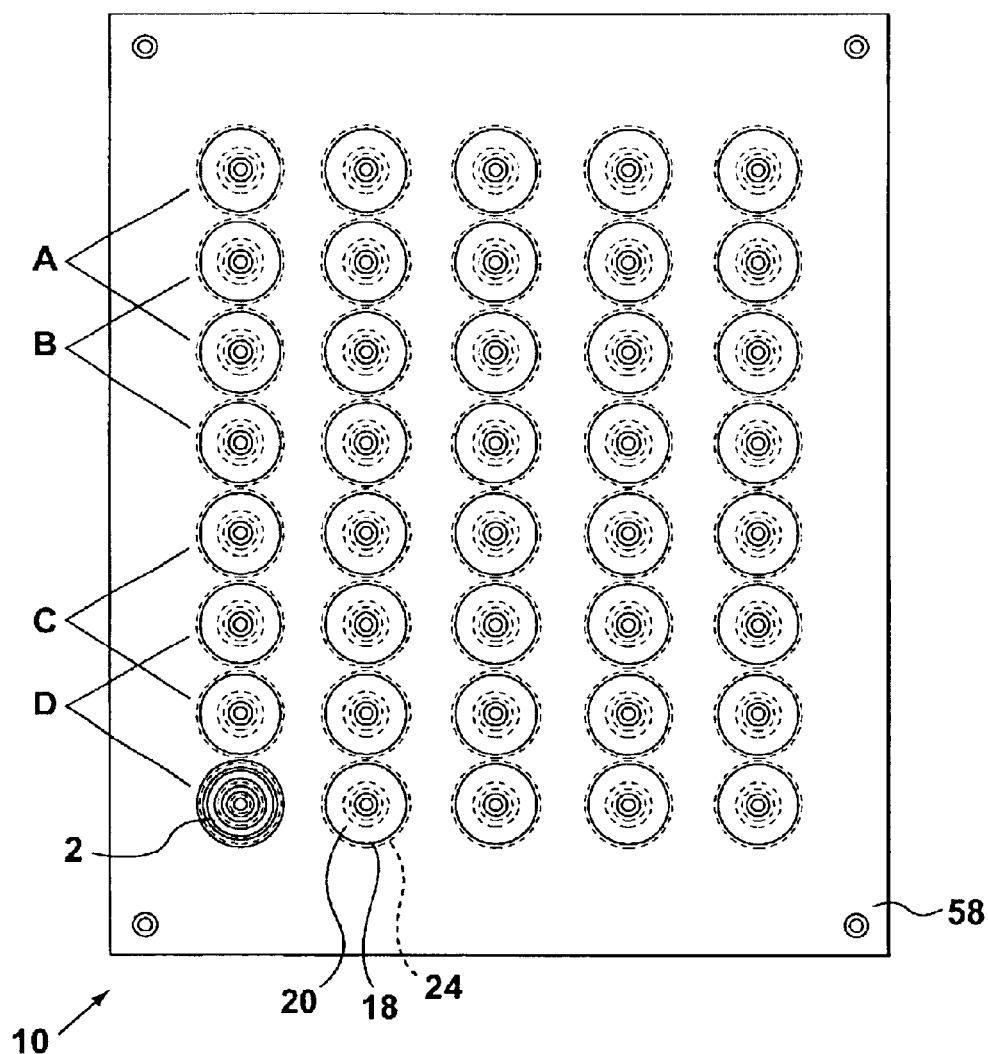
FIG. 14A is a plan view of an alternative embodiment of the end-of-arm tool of the present invention for use with an injection molding machine in a two-step process for the production of hollow plastic articles.
Figure 14B:
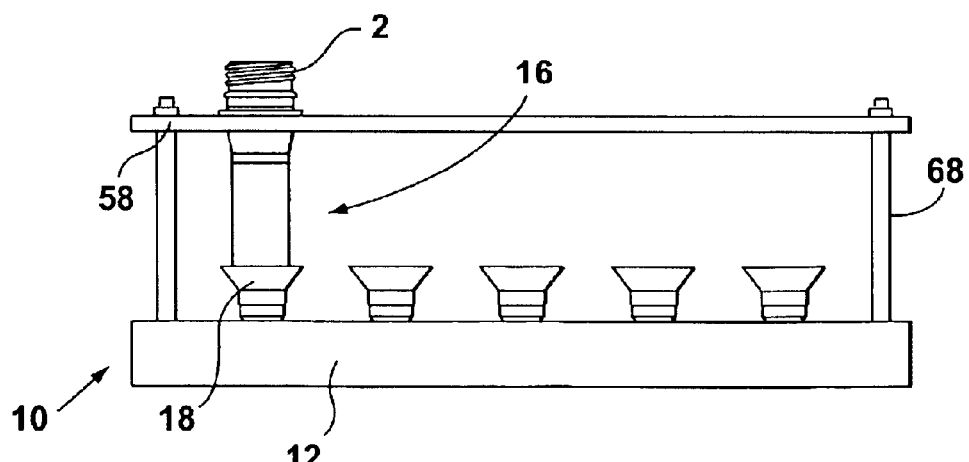
FIG. 14B is a side view of the alternative embodiment of the end-of-arm tool of FIG. 14A.

Referring to FIGS. 14A and 14B, another alternative embodiment of the end-of-arm tool, generally indicated at 10, is shown. The end-of-arm tool includes a tooling base 12 with four sets, indicated as A, B, C, D, of end-effectors 18 in rows thereon at a matching pitch and quantity within each set to that of the injection cores 4 (not shown) on the injection mold core plate assembly 40 (not shown). The end-of-arm tool 10 further includes an alignment plate 58. Each alignment plate 58 includes an array of regularly spaced openings therethrough, the spacing matches that of the end-effector 18 on the tooling plate 12. Each opening defines an aligning surface 24 for engaging a body portion 26 of the preform 2 when the preform 2 is coupled in the end-effector 18. The alignment plate 58 is attached to the tooling plate 12 by alignment jig spacers 68 such that the aligning surfaces 24 are in centered alignment with the corresponding end-effector 18. In cooperation, the end-effector 18 and aligning surface 24 provide the aligning coupler, generally indicated at 16. The tooling plate further including several manifolds 55 (not shown) for connecting the end-effectors 18 in each row to a common air pressure source 34, 35 (not shown).

Figure 6:
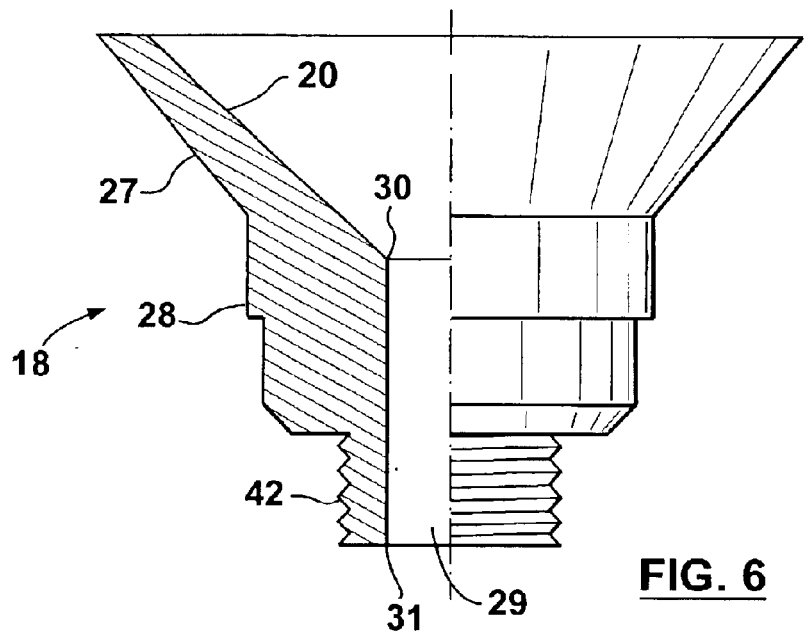
FIG. 6 is a partial section view of the end-effector used in an embodiment of the aligning coupler of the present invention.

Referring to FIG. 6, an embodiment of the end-effector 18 for use in the aligning coupler (shown in FIGS. 4, 8A, 8B, 9A, 9B, 10A, 10B, 11B, 12B, 13A, 13B, and 14B), generally indicated at 16, is shown. The end-effector 18 includes a coupling surface 20 formed on a resilient crown portion 27, a stem 28 beneath the crown 27 and a duct 29 therethrough. A first opening 30 of the duct 29 intersects the coupling surface 20, and a second opening 31 of the duct at a base of the stem 28. The end-effector 18 further includes a first connector 42 that is threaded. When coupling a preform 2 (not shown), the coupling surface 20 substantially conforms to a preform end portion 22 and seals therewith under a vacuum pressure applied through the duct 29 to the first duct opening 30. The coupling surface 20 returns to a conicaly-shaped neutral configuration when the vacuum is released. The end-effector 18 formed from silicone rubber to provide the required resiliency of the crown portion 27.

Figure 7:
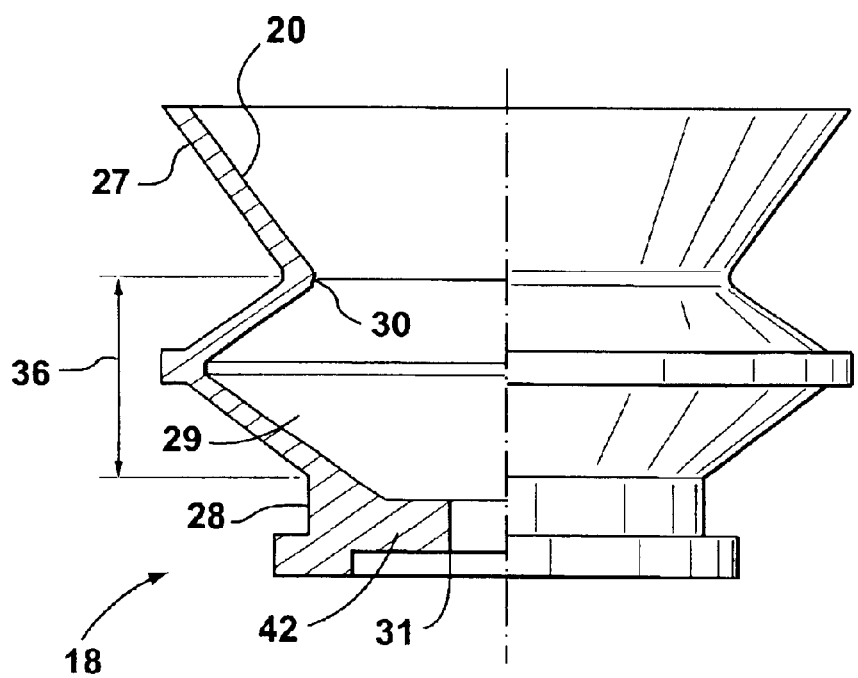
FIG. 7 is a partial section view of a bellows-type end-effector used in an alternative embodiment of the aligning coupler of the present invention.

Referring to FIG. 7, an alternative embodiment of the end-effector 18 for use in the aligning coupler (shown in FIGS. 15B, and 15B), generally indicated at 16, is shown. The end-effector 18 includes a coupling surface 20 formed on a resilient crown portion 27, divided from a stem 28 by a bellows section 36, and a duct 29 therethrough. A first opening 30 of the duct 29 intersects the coupling surface 20, and a second opening 31 of the duct at a base of the stem 28. The end-effector 18 further includes a first connector 42. When coupling a preform 2 (not shown), the coupling surface 20 substantially conforms to a preform end portion 22 and seals therewith under a vacuum pressure applied through the duct 29 to the first duct opening 30. The coupling surface 20 returns to a conicaly-shaped neutral configuration when the vacuum is released. The end-effector 18 formed from silicone rubber to provide the required resiliency of the crown portion 27.

Referring to FIGS. 8A and 8B, an embodiment of the aligning coupler, generally indicated at 16, is shown installed on a tooling plate 12. In cooperation, an end-effector 18, as in FIG. 6, an aligning jig 32, and flow director 46 provide the aligning coupler 16. FIG. 8A illustrates the aligning coupler 16, providing thermal conditioning to a preform 2 retained by a core 4 and neck ring pair 6 of the injection mold core plate assembly 40. During conditioning, the aligning coupler 16 is positioned in longitudinal alignment with the preform 2 with a clearance gap between the coupling surface 20 of the end-effector 18 and an end portion 22 of the preform 2. The thermal conditioning is provided by convective heat transfer with an airflow, as represented by the arrows, established between the preform 2 outer body and the flow director 46 of the aligning coupler 16. FIG. 8B illustrates the aligning coupler 16 of FIG. 8A with a preform 2 retained therein, the preform end-portion 22 coupled by the end-effector 18, a preform body portion 26 engaged in the aligning jig 32.

The aligning coupler, generally indicated at 16, further includes an end-effector support 60 with a first connector 62 threadably connected with the first connector 42 of the end-effector 18. The end-effector support 60 further includes a second connector 64 for connection with a complementary connector 44 on the tooling base 12, and a duct 66 therethrough for connecting the end-effector 18 duct 29 with a manifold 55 in the tooling plate 12. The end-effector 18 arranged to couple and decouple, in use, a preform 2 controlled by the application of negative or positive air pressure 34, 35 respectively through the first opening 30.

The alignment jig 32 includes an opening therethrough that defines an aligning surface 24. The required fit between the aligning surface 24 and the preform body portion 26 is to be loose enough to avoid binding when the preform 2 is transferred into or out of engagement therewith, and to provide sufficient alignment for the preform 2 as to enable the transfer of the preform 2 onto a retaining means of a blow molding machine. The clearance between the aligning surface 24 and the preform body portion 26 is dependent on preform geometry as well as the design of the blow molding machine retaining means. The alignment jig 32 may be attached directly to the tooling plate 12 by any suitable means such that the alignment surface 24 is in centered alignment with end-effector 18 and spaced therefrom; for the sake of this embodiment, alignment jig spacers 68 as in FIG. 11B are to be used. The required spacing between aligning surface 24 and the coupling surface 20 of the end-effector 18 is such that an engaged preform 2 has: an interference fit between its end portion 22 and the coupling surface 20 of the end-effector 18; and a body portion 26 of the preform 2 is engaged by an aligning means provided by an alignment jig 32.

The flow director 46 is a substantially straight-walled tube mounted in centered alignment with the end-effector 18 on the tooling base 12. The flow director arranged to direct, during a preform 2 thermal conditioning operation, an airflow around a body portion of the at least one preform 2 retained on its injection mold core plate assembly 40.

Figure 9B:
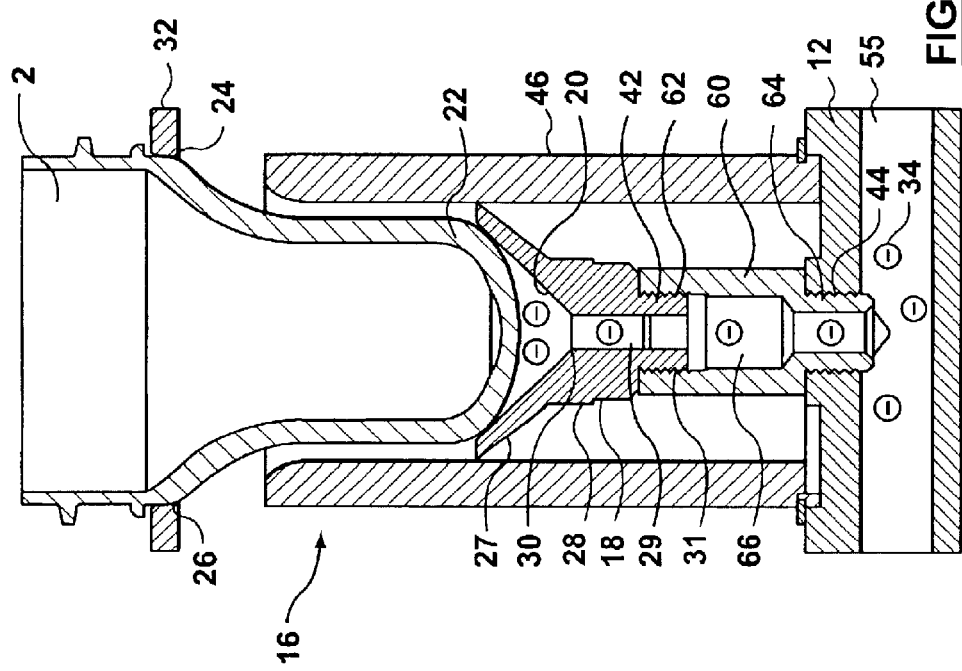
FIG. 9B is a section view of an alternative embodiment of the aligning coupler of the present invention, shown in operation with a preform retained therein.
Figure 9A:
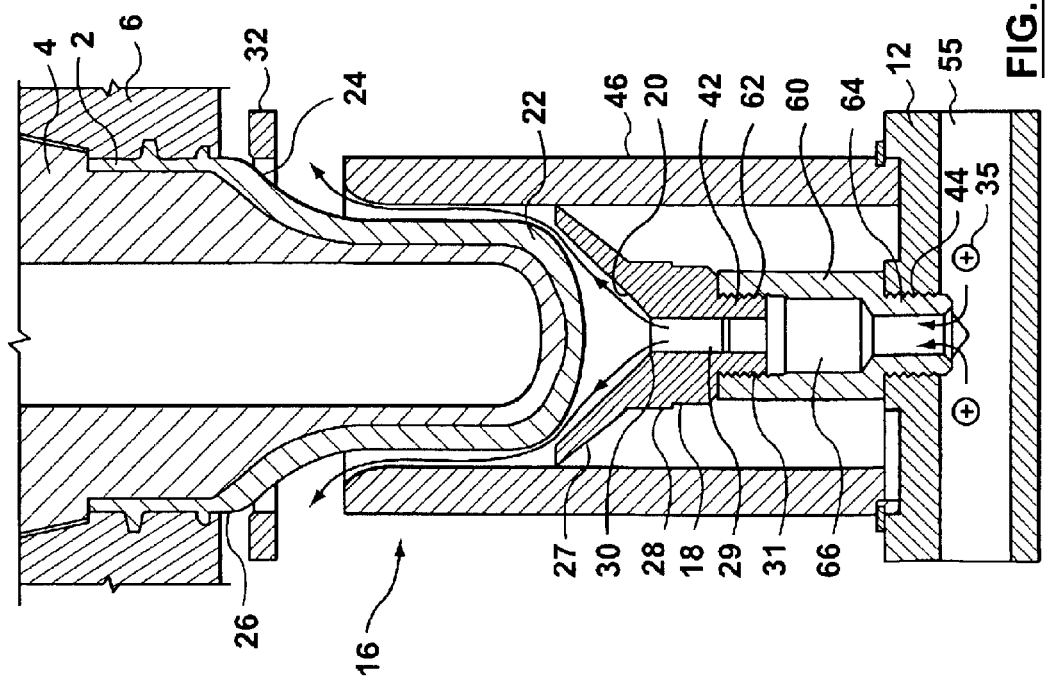
FIG. 9A is a section view of an alternative embodiment of the aligning coupler of the present invention, shown in operation conditioning a preform retained on the injection mold core plate assembly.

Referring to FIGS. 9A and 9B, an alternative embodiment of the aligning coupler, generally indicated at 16, of FIGS. 8A and 8B, is shown wherein the flow director 46 is a tube with an inner wall that is profiled to be substantially symmetrical and offset from the outer geometry of the preform.

Referring to FIGS. 10A and 10B, an alternative embodiment of the aligning coupler, generally indicated at 16, of FIGS. 8A and 8B, is shown wherein the flow director 46 includes a flow head 53 adjustably engaged on a support member 54, the support member 54 mounted in centered alignment with the end-effector 18 on the tooling base 12. The flow head 53 is a tube with an inner wall including an annular projection. The position of the annular projection adjusted to provide increased heat transfer in the adjacent portion of the preform 2.

Referring to FIG. 15A, an alternative embodiment of the aligning coupler, generally indicated at 16, for installation on a tooling plate 12 (not shown). In cooperation, an end-effector 18, as in FIG. 7, an aligning jig 32, and flow director 46 provide the aligning coupler 16.

The aligning coupler, generally indicated at 16, further includes an end-effector support 60 with a first connector 62 connected with the first connector 42 of the end-effector 18. The end-effector support 60 further includes a second connector 64 for connection with a complementary connector (not shown) on the tooling base 12 (not shown), and a duct 66 therethrough for connecting the end-effector 18 duct 29 with a source of air pressure. The end-effector 18 arranged to couple and decouple, in use, a preform 2 controlled by the application of negative or positive air pressure respectively through the first opening 30.

The alignment jig 32, as in FIG. 8A, except that it is threadably connected directly to the open end of flow director 46.

The flow director 46, as in FIG. 8A, except that so is mount ed to the tooling plate 12 (not shown) through the use of a flow director clamp 114.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications, which are within its spirit and scope as defined by the claims.

What is claimed is:

1. An end-of-arm tool for handling at least one preform, the end-of-arm tool comprising:
    a tooling base; and
    at least one aligning coupler retained on the tooling base and configured to releasably retain the at least one preform;
    each of the at least one aligning coupler including:
    coupling means configured to substantially conform to an end portion of a preform and to couple therewith when retaining the preform, the coupling means being configured to return to a neutral configuration when the preform is released; and
    alignment means configured to engage a body portion of one of the at least one preform for aligning the preform with the coupling means;
    the at least one aligning coupler being configured to substantially avoid directly influencing a heat distribution of the at least one preform retained therein.

2. The end-of-arm tool of claim 1, wherein the alignment means comprises an aligning surface of an opening in one of:
    an alignment jig; and
    an alignment insert retained on an alignment jig.

3. The end-of-arm tool of claim 2, wherein the coupling means comprises a coupling surface on an end-effector.

4. The end-of-arm tool of claim 3, wherein the coupling surface is formed on a crown portion of the end-effector.

5. The end-of-arm tool of claim 4, wherein the end-effector further includes a stem beneath the crown and a duct therethrough, a first opening of the duct intersecting the coupling surface, and a second opening of the duct being disposed at a base of the stem, the end-effector being configured to couple and decouple a preform controlled by the application of air pressure respectively through the first opening by means of an air pressure source connected to the second opening and acting through the duct.

6. The end-of-arm tool of claim 5, wherein the neutral configuration of the coupling surface is conical.

7. The end-of-arm tool of claim 6, wherein the end-effector further includes a first connector on the stem for connection with a complementary connector on the tooling base.

8. The end-of-arm tool of claim 7, wherein the end-effector is formed from rubber.

9. The end-of-arm tool of claim 8, wherein the end-effector includes a bellows section between the crown and the stem.

10. The end-of-arm tool of claim 3 wherein each of the at least one aligning coupler further includes include a flow director surrounding the end-effector, the flow director being configured arranged to temperature condition a preform retained on an injection mold core plate assembly of an injection mold by directing an airflow around a body portion of the at least one preform, the airflow being generated by an air pressure source acting through the first opening of the endeffector.

11. The end-of-arm tool of claim 10, wherein the at least one flow director is mounted to the tooling base.

12. The end-of-arm tool of claim 10, wherein the flow director comprises a substantially straight-walled tube.

13. The end-of-arm tool of claim 10, wherein the flow director comprises a tube with an inner wall profiled to be substantially symmetrical and offset from the outer geometry of the preform.

14. The end-of-arm tool of claim 10, wherein the flow director comprises a flow head adjustably engaged on a support member.

15. The end-of-arm tool of claim 14, wherein the flow head comprises a tube with an inner wall including an annular projection.

16. The end-of-arm tool of claim 12, wherein the alignment jig is mounted at a distal end of the at least one flow director.

17. The end-of-arm tool of any one of claims claim 1, 2, 3, or 10, wherein a plurality of the aligning couplers are arranged in at least one row on the tooling base.

18. The end-of-arm tool of claim 17, wherein the tooling base includes at least one manifold connecting the duct of each of the end-effectors of the plurality of aligning couplers in each row.

19. The end-of-arm tool of claim 18, wherein the alignment jig comprises be a rail having a plurality of the alignment means thereon for each row of the aligning couplers.

20. The end-of-arm tool of claim 18, wherein the alignment jig is a plate having a plurality of the alignment means thereon.

21. The end-of-arm tool of claim 7 wherein the aligning coupler includes an end-effector support for connecting the end-effector to the tooling base.

22. The end-of-arm tool of claim 21, wherein the end-effector support includes:
    a first connector for receiving the first connector of the end-effector;
    a second connector for connecting to the complementary connector on the tooling base; and
    a duct therethrough.

23. The end-of-arm tool of claim 22, wherein the tooling base further includes at least one alignment jig spacer spacing the alignment jig from the tooling base.

24. The end-of-arm tool of claim 1, wherein the tooling base further includes a bumper, the bumper being configured to interface with a complementary bumper on an injection mold to effect a coordination of movement between an injection mold stripper plate and the end-of-arm tool when transferring the preforms from the injection mold into the aligning couplers.

25. The end-of-arm tool of claim 24, wherein the tooling base includes at least one robot spacer sleeve, the robot spacer sleeve being configured to provide an interface to a robotic actuator.

26. An aligning coupler for an end-of-arm tool for handling a preform, the aligning coupler comprising:
coupling means configured to substantially conform to an end portion of a preform and to couple therewith when retaining the preform, the coupling means being configured to return to a neutral configuration when the preform is released; and
alignment means configured to engage, in use, a body portion of the preform for aligning the preform with the coupling means;
the aligning coupler being configured to substantially avoid directly influencing a heat distribution of the preform retained therein.

27. The aligning coupler of claim 26, wherein the alignment means comprises an aligning surface of an opening in one of:
an alignment jig; and
an alignment insert retained on an alignment jig.

28. The aligning coupler of claim 27, wherein the coupling means comprises a coupling surface on an end-effector.

29. The aligning coupler of claim 28, wherein the coupling surface is formed on a crown portion of the end-effector.

30. The aligning coupler of claim 29, wherein the end-effector further includes a stem beneath the crown and a duct therethrough, a first opening of the duct intersecting the coupling surface, and a second opening of the duct being disposed at a base of the stem, the end-effector being configured to couple and decouple a preform controlled by the application of air pressure respectively through the first opening by means of an air pressure source connected to the second opening and acting through the duct.

31. The aligning coupler of claim 30, wherein the neutral configuration of the coupling surface is conical.

32. The aligning coupler of claim 31, wherein the end-effector further includes a first connector on the stem configured to connect the end-effector with a complementary connector on a tooling base.

33. The aligning coupler of claim 32, wherein the end-effector is formed from rubber.

34. The aligning coupler of claim 33, wherein the end-effector includes a bellows section between the crown and the stem.

35. The aligning coupler of claim 30, wherein the aligning coupler further includes a flow director surrounding the end-effector, the flow director being configured to temperature condition a preform retained on a injection mold core plate assembly of an injection mold by directing an airflow around a body portion of the retained preform, the airflow being generated by an the air pressure source acting through the first opening of the end-effector.

36. The aligning coupler of claim 35, wherein the flow director comprises a substantially straight-walled tube.

37. The aligning coupler of claim 35, wherein the flow director comprises a tube with an inner wall profiled to be substantially symmetrical and offset from the outer geometry of the preform.

38. The alignment coupler of claim 35, wherein the flow director comprises a flow head adjustably engaged on a support member.

39. The aligning coupler of claim 38, wherein the flow head comprises a tube with an inner wall including an annular projection.

40. An integrated injection molding and blow molding system for the production of hollow plastic articles, the system comprising:
an injection molding machine including:
an injection unit configured arranged to provide a controlled flow of pressurized molten plastic; and
an injection mold clamp unit configured to operate an injection mold between a mold open position and a mold clamped position, the injection unit being connected to the injection mold clamp unit and configured to direct the flow of molten plastic into the injection mold for forming the at least one preform; and
a robotic actuator including an end-of-arm tool configured to handle the at least one preform formed in the injection mold;
the end-of-arm tool including:
a tooling base; and
at least one aligning coupler retained on the tooling base and configured to releaseably retain the at least one preform;
each of the at least one aligning coupler including:
coupling means configured arranged to substantially conform to an end portion of a preform and to couple therewith when retaining the preform, the coupling means being configured to return to a neutral configuration when the preform is released; and
alignment means configured to engage a body portion of one of the at least one preform for aligning the preform with the coupling means;
the at least one aligning coupler being configured to substantially avoid directly influencing a heat distribution of the at least one preform retained therein; and
a blow molding machine including a blow clamp configured to operate a blow mold between a mold open position and a mold clamped position, the blow mold being configured to receive at least one of the at least one preform, and being configured to blow the preform into the hollow plastic articles.

41. The system of claim 40, wherein the alignment means is an aligning surface of an opening in one of:
an alignment jig; and
an alignment insert retained on an alignment jig.

42. The system of claim 41, wherein the coupling means comprises, a coupling surface on an end-effector.

43. The system of claim 42, wherein the coupling surface is formed on a crown portion of the end-effector.

44. The system of claim 43, wherein the end-effector further includes a stem beneath the crown and a duct therethrough, a first opening of the duct intersecting the coupling surface, and a second opening of the duct being disposed at a base of the stem, the end-effector being configured to couple and decouple a preform controlled by the application of air pressure respectively through the first opening by means of an air pressure source connected to the second opening and acting through the duct.

45. The system of claim 44, wherein the neutral configuration of the coupling surface is conical.

46. The system of claim 45, wherein the end-effector further includes a first connector on the stem configured to connect complementary connector on the tooling base.

47. The system of claim 46, wherein the end-effector is formed from rubber.

48. The system of claim 47, wherein the end-effector includes a bellows section between the crown and the stem.

49. The system of claim 44, wherein each of the at least one aligning coupler further include a flow director surrounding the end-effector, the flow director being configured to temperature condition a preform retained on a injection mold core plate assembly of an injection mold by directing an airflow around a body portion of the at least one preform, the airflow being generated by the air pressure source acting through the first opening of the end-effector.

50. The system of claim 49, wherein the at least one flow director is mounted to the tooling base.

51. The system of claim 49, wherein the flow director is a substantially straight-walled tube.

52. The system of claim 49, wherein the flow director comprises a tube with an inner wall profiled to be substantially symmetrical and offset from the outer geometry of the preform.

53. The system of claim 49, wherein the flow director comprises a flow head adjustably engaged on a support member.

54. The system of claim 53, wherein the flow head comprises a tube with an inner wall including an annular projection.

55. The system of claim 51, wherein the alignment jig is mounted at a distal end of the at least one flow director.

56. The system of any one of claims 44 or 49, wherein a plurality of the aligning couplers are arranged in at least one row on the tooling base.

57. The system of claim 56, wherein the tooling base includes at least one manifold connecting the duct of each of the end-effectors of the plurality of aligning couplers in each row.

58. The system of claim 57, wherein the alignment jig comprises a rail having a plurality of the alignment means thereon for each row of the aligning couplers.

59. The system of claim 57, wherein the alignment jig comprises a plate having a plurality of the alignment means thereon.

60. The system of claim 46, wherein the aligning coupler includes an end-effector support for connecting the end-effector to the tooling base.

61. The system of claim 60, wherein the end-effector support includes:
 a first connector configured to receive the first connector of the end-effector;
 a second connector for connecting to the complementary connector on the tooling base; and
 a duct therethrough.

62. The system of claim 61, wherein the tooling base further includes at least one alignment jig spacer configured to space the alignment jig from the tooling base.

63. The system of claim 40, wherein the tooling base further includes a bumper, the bumper being configured to interface with a complementary bumper on an injection mold to effect a coordination of movement between an injection mold stripper plate and the end-of-arm tool when transferring the preforms from the injection mold into the aligning couplers.

64. The system of claim 63, wherein the tooling base includes at least one robot spacer sleeve, the robot spacer sleeve being configured to provide an interface to a robotic actuator.

65. The end-of-arm tool of claim 10, wherein the flow director comprises a tube with an inner wall that includes an annular projection.

66. The end of arm tool of any one of claims 18, 19, or 20, further including an air cooling means configured to convectively cool a plurality of preforms retained in the plurality of aligning couplers.

67. The end-of-arm tool of claim 66, wherein the plurality of aligning couplers is set to be a multiple of the number of performs formed in a single molding shot.

68. The aligning coupler of claim 35, wherein the flow director comprises a tube with an inner wall that includes an annular projection.

69. The system of claim 49, wherein the flow director comprises a tube with an inner wall that includes an annular projection.

70. The system of any one of claim 56, further including an air cooling means configured to convectively cool a plurality of preforms retained in the plurality of aligning couplers.

71. The system of claim 70, wherein the plurality of aligning couplers is set to be a multiple of the number of performs formed in a single shot.

* * * * *